United States Patent
Gupta et al.

(10) Patent No.: US 8,974,576 B2
(45) Date of Patent: Mar. 10, 2015

(54) $CO_2$ CAPTURE PROCESSES USING ROTARY WHEEL CONFIGURATIONS

(71) Applicants: Ramesh Gupta, Berkley Heights, NJ (US); Hans Thomann, Bedminster, NJ (US); Richard D. Lenz, Amherst, NY (US); Simon C. Weston, Annandale, NJ (US)

(72) Inventors: Ramesh Gupta, Berkley Heights, NJ (US); Hans Thomann, Bedminster, NJ (US); Richard D. Lenz, Amherst, NY (US); Simon C. Weston, Annandale, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 14/085,982

(22) Filed: Nov. 21, 2013

(65) Prior Publication Data

US 2014/0174291 A1  Jun. 26, 2014

Related U.S. Application Data

(60) Provisional application No. 61/740,065, filed on Dec. 20, 2012.

(51) Int. Cl.
*B01D 53/02* (2006.01)
*B01D 53/06* (2006.01)
(Continued)

(52) U.S. Cl.
CPC ............ *B01D 53/06* (2013.01); *B01D 53/0462* (2013.01); *B01D 53/047* (2013.01); *B01D 2253/342* (2013.01); *B01D 2257/504* (2013.01);
(Continued)

(58) Field of Classification Search
CPC ................... B01D 2253/342; B01D 2257/504; B01D 2258/0283; B01D 2259/657; B01D 53/0462; B01D 53/047; B01D 53/06
USPC .............................................. 95/96, 139, 148
See application file for complete search history.

(56) References Cited

U.S. PATENT DOCUMENTS

| | | | |
|---|---|---|---|
| 4,324,564 | A | 4/1982 | Oliker |
| 4,775,484 | A | 10/1988 | Schmidt et al. |
| 4,778,492 | A | 10/1988 | Dawson |

(Continued)

FOREIGN PATENT DOCUMENTS

| | | |
|---|---|---|
| EP | 2258879 A1 | 12/2010 |
| JP | 2003181242 A1 | 7/2003 |
| JP | 4414110 B2 | 2/2010 |

OTHER PUBLICATIONS

Pan et al., "Constant Pattern Adiabatic Fixed Bed Adsorption", Chemical Engineering Science, Mar. 1967, vol. 22, issue 3, pp. 285-297, Pergamon.

(Continued)

*Primary Examiner* — Christopher P Jones
(74) *Attorney, Agent, or Firm* — David M. Weisberg; Andrew T. Ward

(57) ABSTRACT

The disclosure relates to a continuous or semi-continuous, cyclic, countercurrent sorption-desorption method for enhanced control, separation, and/or purification of $CO_2$ gas from one or more sources of a mixture of gases through integrated use of solid monolithic sorbents having a sorption selectivity for the $CO_2$ gas, wherein liquid phase water is added to increase the heat capacity of the mixed gas source(s) in order to achieve a thermal wave moving through the thickness of the sorbent material faster than the $CO_2$ sorption wave.

27 Claims, 1 Drawing Sheet

(51) Int. Cl.
*B01D 53/04* (2006.01)
*B01D 53/047* (2006.01)

(52) U.S. Cl.
CPC ... *B01D 2258/0283* (2013.01); *B01D 2259/657* (2013.01)
USPC .................................. 95/96; 95/139; 95/148

(56) References Cited

U.S. PATENT DOCUMENTS

| | | | |
|---|---|---|---|
| 6,500,236 B2 | 12/2002 | Suzuki et al. | |
| 6,521,026 B1 | 2/2003 | Goto | |
| 6,596,248 B2 | 7/2003 | Schimkat et al. | |
| 6,783,738 B1 | 8/2004 | Sasaki et al. | |
| 7,022,168 B2 | 4/2006 | Schimkat et al. | |
| 7,166,149 B2 | 1/2007 | Dunne et al. | |
| 7,556,673 B2 | 7/2009 | Schubert et al. | |
| 7,799,117 B1 | 9/2010 | Li et al. | |
| 2003/0143448 A1* | 7/2003 | Keefer | 429/26 |
| 2004/0197612 A1* | 10/2004 | Keefer et al. | 429/13 |
| 2005/0215481 A1 | 9/2005 | Kim et al. | |
| 2005/0217481 A1 | 10/2005 | Dunne et al. | |
| 2008/0282892 A1* | 11/2008 | Deckman et al. | 96/140 |
| 2009/0214902 A1 | 8/2009 | Pelman et al. | |
| 2012/0037002 A1* | 2/2012 | Frydman et al. | 96/118 |
| 2012/0125194 A1 | 5/2012 | Caram et al. | |
| 2012/0222553 A1* | 9/2012 | Kamakoti et al. | 95/99 |

OTHER PUBLICATIONS

Pan et al., "An analysis of adiabatic sorption of single solutes in fixed beds: pure thermal wave formation and its practical implications", Chemical Engineering Science, Nov. 1970, vol. 25, issue 11, pp. 1653-1664.

Liu et al., "Preparation of pitch-based spherical activated carbon with developed mesopore by the aid of ferrocene", Carbon, Mar. 8, 1999, vol. 37 issue 4, pp. 663-667, Science Direct.

Matsukuma et al., "Study of $CO_2$ recovery system from flue gas by honeycomb type adsorbent I.", Kagaku Kogaku Ronbunshu, 32(2), 2006, 138-145.

Matsukuma et al., "Simulation of $CO_2$ recovery system from flue gas by honeycomb type adsorbent: II. Optimization of $CO_2$ recovery system and proposal for actual plant", Kagaku Kogaku Ronbunshu, vol. 32, iss. 2, 2006, 146-152.

Shen et al., "Adsorption Equilibria and Kinetics of $CO_2$ and $N_2$ on activated Carbon Beads", Chemical Engineering Journal, Jun. 2010, vol. 160, issue 2, pp. 398-407.

Krishnan, "Development of Novel Carbon Sorbents for $CO_2$ Capture", presented at the 2010 NETL $CO_2$ Capture Technology Meeting, Sep. 13-17, 2010, Pittsburgh, PA.

International Search Report with Written Opinion for PCT/US2013/071178 dated Feb. 17, 2014.

* cited by examiner

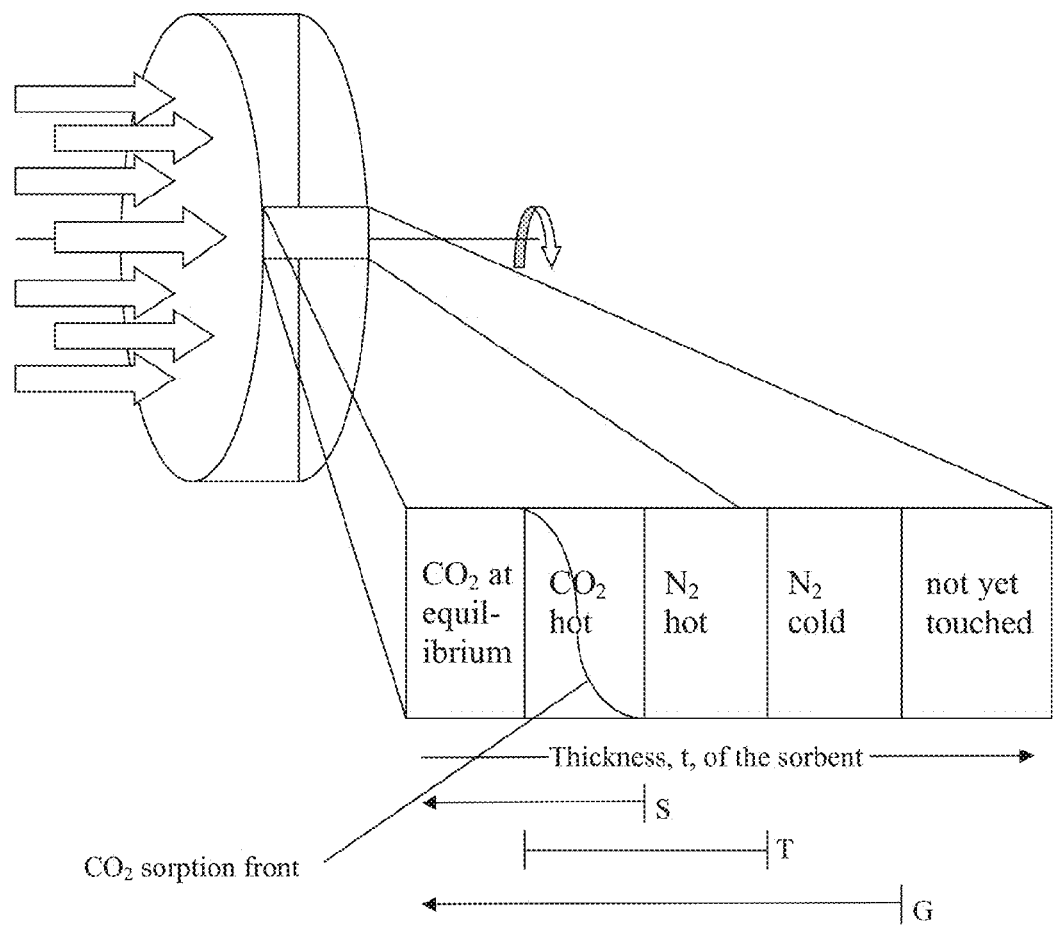

CO₂ CAPTURE PROCESSES USING ROTARY WHEEL CONFIGURATIONS

CROSS-REFERENCE TO RELATED APPLICATIONS

This application claims the benefit of U.S. Application Ser. No. 61/740,065, filed on Dec. 20, 2012; which is incorporated by reference herein in its entirety.

FIELD OF THE INVENTION

This invention relates to methods for enhanced control, separation, and/or purification of $CO_2$ gas from one or more sources of a mixture of gases in a continuous or semi-continuous cyclic sorption-desorption process.

BACKGROUND OF THE INVENTION

Global climate change concerns may necessitate capture of carbon oxide gases such as $CO_2$, e.g., from flue gases and other process streams. One traditional approach involves absorption of $CO_2$ with an amine solution, such as monoethanolamine (MEA), other ethanolamines, or certain amine mixtures, which solution is then thermally regenerated and recycled. This traditional approach is capital and energy intensive. There is considerable prior art in this area of conventional liquid sorption.

There is also some level of prior art regarding solid sorbents and rotary wheels. For example, there are the following scholarly articles: C. Y. Pan et al. *Chemical Engineering Science*. 22 (1967), 285: C. Y. Pan et al., *Chemical Engineering Science*, 25 (1970), 1653; Ralph T. Yang, *Gas Separation and Adsorption Processes*, Imperial College Press, 1997; Y. Matsukuma et al., "Study of $CO_2$ recovery system from flue gas by honeycomb type adsorbent I.", *Kagaku Kogaku Ronbunshu*, 32(2), 2006, 138-145; Y. Matsukuma et al., "Simulation of $CO_2$ recovery system from flue gas by honeycomb type adsorbent: II. Optimization of $CO_2$ recovery system and proposal for actual plant", *Kagaku Kogaku Ronbunshu*, 32(2). 2006, 146; C. Shen et al. "Adsorption Equilibria and Kinetics of $CO_2$ and $N_2$ on activated Carbon Beads". *Chemical Engineering Science*, 160 (2010), 398-407; Z. C. Liu et al., *Carbon*, 37 (4), 1999, 663-667; and G. Krishnan, "Development of Novel Carbon Sorbents for $CO_2$ Capture", presented at the 2010 NETL $CO_2$ Capture Technology Meeting, 13-17 Sep. 2010, Pittsburgh, Pa. There are also the following patent-related publications: U.S. Patent Application Publication Nos. 2005/0215481, 2005/0217481, and 2009/0214902; U.S. Pat. Nos. 4,778,492, 6,500,236, 6,596,248, 6,521,026, 6,783,738, 7,022,168, and 7,166,149; European Patent Nos. EP 1138369 and EP 2258879; Japanese Patent Publication No. 2003181242; and Japanese Patent No. 4414110.

It would be highly desirable to employ a sorption method that is less capital and energy intensive than conventional liquid amine sorbents and that can provide an efficiency advantage.

SUMMARY OF THE INVENTION

One aspect of the invention relates to a continuous or semi-continuous, cyclic, countercurrent sorption-desorption method for enhanced control, separation, and/or purification of $CO_2$ gas from one or more sources of a mixture of gases (and/or carbonaceous liquids that have sufficient vapor pressure) through integrated use of solid monolithic sorbents having a selectivity for the $CO_2$ gas. Though described herein as "monolithic", the solid sorbents according to the invention can be aggregated particulate, monolithic, and/or structured, so long as they behave as if solid and cohesive from the point of view of the contact with the gaseous/fluid streams described herein. Although liquid amine-based materials can be considered conventional sorbents, solid monolithic sorbents (particularly when employed in a rotating wheel-type configuration) can have distinct advantages over conventional sorbents, including, but not necessarily limited to, the ability to process relatively large gas volumes/flow rates, continuous operation, and few/no valves (thus little or no flow switching required).

Typical flue gas volumes of about 50-100 million $ft^3$/hr can be emitted from a large refinery or a coal power plant, and, as such, the methods according to the invention can advantageously have adequate adsorption capacity to capture the $CO_2$ content, which can be realized, e.g., by using at least 2 to about 10 large rotary wheels that may each have, in one embodiment, diameters of approximately 10-80 feet and widths of approximately 6 inches to 2 feet, or more. Additionally or alternately, the gas velocity entering such rotary adsorbent wheels can be up to about 15 ft/sec or more, and/or the pressure drop across such rotary adsorbent wheels can be less than 4 psi, e.g., less than 3 psi, less than 2 psi, less than 1 psi, less than 0.5 psi, less than 0.3 psi, less than 0.2 psi, or less than 0.1 psi.

In order for solid adsorbent to be generally effective for $CO_2$ capture, at least one, and preferably most or all, of the following can advantageously apply: the sorbent material can have a relatively high adsorption capacity for $CO_2$, so as to reduce/minimize the required adsorbent volume and/or process footprint; the sorbent material can have relatively fast carbon dioxide sorption and desorption kinetics, e.g. so that relatively short sorption-desorption cycle times (e.g., about 15 seconds to about 10 minutes) can be utilized, allowing increased/optimized productivity for a given size plant; the sorbent material can have a relatively high tolerance to water, e.g., so that moisture in the flue gas does not significantly reduce $CO_2$ adsorption; the sorbent material can have an acceptable tolerance to contaminants (in flue gases, those can include $SO_x$ and/or $NO_x$), with no significant reduction in $CO_2$ capacity, e.g., due to irreversible binding or chemical reaction of such contaminants with the sorption sites; the sorbent material can have relative stability to temperature cycling and steam; and the sorbent material can have relatively high $CO_2/N_2$ sorption selectivity (flue gas can typically exhibit as high as 85-90% $N_2$ and generally about 20% $CO_2$ or less).

In situations where the solid monolithic sorbent(s) is(are) comprised of alkali modified (basic) alumina, one advantage can be that they can adsorb unusually high quantities of $CO_2$ at temperatures above 100° C., which can allow a lower temperature differential between the adsorption and desorption steps/stages. Such an arrangement can offer much lower energy requirements, higher achievable $CO_2$ purities, faster cycle times, and thus typically smaller hardware than other thermal swing adsorption (TSA) processes and/or other processes operating at less than 100° C. Other advantages of utilizing alkali modified (basic) alumina sorbent materials in the methods according to the invention can include, but are not necessarily limited to, relatively low heat of sorption, relative to other adsorbents, which can result in relatively low energy requirements for desorption and/or regeneration steps; and relatively fast adsorption and desorption kinetics allowing a shorter sorption-desorption cycle time, which can manifest as higher throughput for a given size adsorption system or as relatively smaller footprint for a given throughput. Additionally or alternatively in situations where the solid monolithic sorbent(s) is(are) comprised of alkali modified (basic) alumina, the modified alumina may optionally be disposed as a wash-coat on the surface(s) of the solid monolithic sorbent(s).

Wash-coats can be used to introduce functionality to a solid monolithic sorbent and/or to augment already existing functionality. For example, though it is possible to use multiple, separate solid monolithic sorbents (e.g., a first upstream sorbent to remove water from a flue gas, followed by a second downstream sorbent for $CO_2$ removal), wash-coating can be used to combine such processes into a single, layered solid monolithic sorbent. When a wash-coat is utilized, its thickness can be tailored (optimized) to allow rapid $CO_2$-adsorbent mass exchange and to advantageously facilitate a large capacity for adsorbed $CO_2$. In general, a thicker wash-coat can increase sorbent capacity, but diffusion resistance can often limit the rate at which the $CO_2$ can be adsorbed/desorbed. Alternately, a relatively thin wash-coat can allow relatively rapid $CO_2$ exchange but with attendant lower sorbent capacity increase, if any is appreciable.

Another variable in cyclic sorption-desorption methods can include pressure drop across each solid monolithic sorbent used. For instance, where flue gas is a/the source of mixed gas, each solid monolithic sorbent can be designed to exhibit a relatively low pressure drop (e.g., less than 4 psi, less than 3 psi, less than 2 psi, less than 1 psi, less than 0.5 psi, less than 0.3 psi, less than 0.2 psi, or less than 0.1 psi). This can be critical, since absolute flue gas pressures can tend to be near ambient pressures. Though it is possible to boost flue gas pressure using a compressor and/or a blower fan, this can generally be unattractive for economic reasons. Narrow monolith flow channels can allow a larger $CO_2$-adsorbent contact area and can be desirable, in some embodiments, from mass transfer considerations. However, narrower flow channels can undesirably increase pressure drop. The size of the channels can be tailored/optimized to achieve acceptable contact area within the constraint of permissible pressure drop. The channels can be circular or of any other shape (such as rectangular, hexagonal, or the like, or modifications thereof, e.g. to include protrusions into the channel for additional contact area) consistent with the requirements of acceptably high mass transfer area and acceptably low pressure drop.

Adsorption can tend to lead to the generation of heat. Rising temperature in the solid monolithic sorbent(s) can tend to reduce sorption capacity. The integration of additional cooling mechanisms to combat adiabatic temperature increases can be effected, e.g., by injection of atomized liquid droplets or sprays or running liquid streams through the sorbent bed or monolith channels. This liquid can advantageously serve to remove heat by vaporization and/or through sensible cooling. Strategies for a cooling step prior to $CO_2$ sorption can include, but are not limited to, at least partial cooling using air blowers, for example. Integrated cooling schemes can involve air/water droplets (e.g. created by atomizers/sprays), which could achieve increased heat management via evaporative cooling mechanisms. Unsaturated and/or relatively dry (e.g., less than 50% relative humidity) air could additionally or alternatively help dehumidify the sorbent beds.

BRIEF DESCRIPTION OF THE DRAWINGS

FIG. 1 shows a blown-up view through the thickness of a solid monolithic sorbent rotary wheel according to the invention with a rotational axis extending parallel to the top/bottom of the page with flow from left to right. This sorbent is in the midst of a sorption step of a sorption-desorption cycle/method according to the invention, where the leading edge of the thermal wave (T) is located at a position downstream (further through the thickness) from the leading edge of the $CO_2$ adsorption wave (S).

DETAILED DESCRIPTION OF THE EMBODIMENTS

The present invention can involve a method for enhanced control, separation, and/or purification of $CO_2$ from one or more sources of a mixture of gases (and/or carbonaceous liquids that have sufficient vapor pressure). Although the present invention is described with reference to $CO_2$, it should be understood that such methods/systems described herein can additionally or alternatively be used to control, separate, and/or purify other gases, individually and/or collectively; such other gases can optionally include, but are not limited to, light (e.g., $C_1$-$C_4$ or $C_1$-$C_3$) hydrocarbons (i.e., saturated, such as methane, ethane, propane, n-butane, isobutane, and the like, and combinations thereof, and/or unsaturated, such as ethylene, propylene, 1-butene. 2-butenes, isobutylene, butadiene, and the like, and combinations thereof), water, hydrogen sulfide, carbon monoxide, carbonyl sulfide, $SO_x$, $NO_x$, and the like, and combinations thereof.

Advantageously, a solid monolithic sorbent can be provided having a selectivity for $CO_2$ in a continuous or semi-continuous cyclic sorption-desorption process. Although the sorbent materials are referred to herein as solid and monolithic, they need only act or behave as solid and monolithic with respect to the flow of the mixed gas source(s)/dual phase sorption feed stream(s). For instance, they can alternately comprise (optionally packed) granular particulate sorbent materials and/or inert (structured) packing onto which sorbent functionality (e.g., amine functionality or the like) can be immobilized/grafted. In certain embodiments, the solid monolithic sorbent can be oriented such that their cross-sectional planes are approximately parallel and such that they rotate about a common rotational axis, e.g., that is substantially perpendicular to the cross-sectional planes of the monolithic sorbents. In such embodiments, each successive solid monolithic sorbent can have a counter-rotational direction that alternates between clockwise and counterclockwise, as viewed along the common rotational axis.

When the term "selectivity" is used herein with respect to the propensity of a sorbent to favor sorption of a desired component (in this case, typically $CO_2$) over an undesired component, it should be understood that such "selectivity" is based on approximately an equilibrium sorption process with the sorbent, and not on a kinetic sorption process. That means that selectivities described herein represent competitive sorption between desired and undesired components on a time scale that is long enough to approximate equilibrium—whether such a sufficiently long time scale may be on the order of portions of seconds or multiple hours (or anywhere in between) should not be particularly relevant. At times herein, selectivity can be expressed only with respect to the desired component (e.g., $CO_2$), leaving the undesired component unnamed, merely to express the importance of the desired component to the separation.

The source(s) of mixed gas can advantageously (collectively and/or each) comprise from about 1 vol % to about 70 vol % $CO_2$, e.g., from about 1 vol % to about 60 vol % $CO_2$, from about 1 vol % to less than 50 vol % $CO_2$, from about 1 vol % to about 45 vol % $CO_2$, from about 1 vol % to about 40 vol % $CO_2$, from about 1 vol % to about 30 vol % $CO_2$, from about 1 vol % to about 25 vol % $CO_2$, from about 1 vol % to about 20 vol % $CO_2$, from about 1 vol % to about 15 vol % $CO_2$, from about 1 vol % to about 10 vol % $CO_2$, from about 1 vol % to about 5 vol % $CO_2$, from about 5 vol % to about 70 vol % $CO_2$, from about 5 vol % to about 60 vol % $CO_2$, from about 5 vol % to less than 50 vol % $CO_2$, from about 5 vol % to about 45 vol % $CO_2$, from about 5 vol % to about 40 vol % $CO_2$, from about 5 vol % to about 30 vol % $CO_2$, from about 5 vol % to about 25 vol % $CO_2$, from about 5 vol % to about 20 vol % $CO_2$, from about 5 vol % to about 15 vol % $CO_2$, from about 5 vol % to about 10 vol % $CO_2$, from about 10 vol % to about 70 vol % $CO_2$, from about 10 vol % to about 60 vol % $CO_2$, from about 10 vol % to less than 50 vol % $CO_2$, from about 10 vol % to about 45 vol % $CO_2$, from about 10 vol % to about 40 vol % $CO_2$, from about 10 vol % to about 30 vol % $CO_2$, from about 10 vol % to about 25 vol % $CO_2$, from about 10 vol % to about 20 vol % $CO_2$, from about 10 vol % to about 15 vol % $CO_2$, from about 15 vol % to about 70 vol % $CO_2$, from about 15 vol % to about 60 vol % $CO_2$, from about 15 vol % to less than 50 vol % $CO_2$, from about 15 vol % to about 45 vol % $CO_2$, from about 15 vol % to about 40 vol % $CO_2$, from about 15 vol % to about 30 vol % $CO_2$, from about 15 vol % to about 25 vol % $CO_2$, from about 15 vol % to about 20 vol % $CO_2$, from about 20 vol % to about 70 vol % $CO_2$, from about 20 vol % to about 60 vol % $CO_2$, from about 20 vol % to less than 50 vol % $CO_2$, from about 20 vol % to about 45 vol % $CO_2$, from about 20 vol % to about 40 vol % $CO_2$, from about 20 vol % to about 30 vol % $CO_2$, from about 20 vol % to about 25 vol % $CO_2$, from about 25 vol % to about 70 vol % $CO_2$, from about 25 vol % to about 60 vol % $CO_2$, from about 25 vol % to less than 50 vol % $CO_2$, from about 25 vol % to about 45 vol % $CO_2$, from about 25 vol % to about 40 vol % $CO_2$, from about 25 vol % to about 30 vol % $CO_2$, from about 30 vol % to about 70 vol % $CO_2$, from about 30 vol % to about 60 vol % $CO_2$, from about 30 vol % to less than 50 vol % $CO_2$, from about 30 vol % to about 45 vol % $CO_2$, from about 30 vol % to about 40 vol % $CO_2$, from about 40 vol % to about 70 vol % $CO_2$, from about 40 vol % to about 60 vol % $CO_2$, from about 40 vol % to less than 50 vol % $CO_2$, from about 40 vol % to about 45 vol % $CO_2$, or from about 50 vol % to about 70 vol % $CO_2$.

Additionally or alternately, the source(s) of mixed gas can (collectively and/or each) comprise not more than 70 vol % moisture content (water vapor saturation/content), prior to any moisture being later added, e.g., not more than 60 vol % moisture, not more than 50 vol % moisture, not more than 40 vol % moisture, not more than 30 vol % moisture, not more than 20 vol % moisture, not more than 10 vol % moisture, from about 0.1 vol % to about 70 vol % moisture, from about 0.1 vol % to about 65 vol % moisture, from about 0.1 vol % to about 60 vol % moisture, from about 0.1 vol % to about 55 vol % moisture, from about 0.1 vol % to about 50 vol % moisture, from about 0.1 vol % to about 45 vol % moisture, from about 0.1 vol % to about 40 vol % moisture, from about 0.1 vol % to about 35 vol % moisture, from about 0.1 vol % to about 30 vol % moisture, from about 0.1 vol % to about 25 vol % moisture, from about 0.1 vol % to about 20 vol % moisture, from about 0.1 vol % to about 15 vol % moisture, from about 0.1 vol % to about 10 vol % moisture, from about 0.1 vol % to about 5 vol % moisture, from about 0.1 vol % to about 3 vol % moisture, from about 0.1 vol % to about 1 vol % moisture, from about 0.3 vol % to about 70 vol % moisture, from about 0.3 vol % to about 65 vol % moisture, from about 0.3 vol % to about 60 vol % moisture, from about 0.3 vol % to about 55 vol % moisture, from about 0.3 vol % to about 50 vol % moisture, from about 0.3 vol % to about 45 vol % moisture, from about 0.3 vol % to about 40 vol % moisture, from about 0.3 vol % to about 35 vol % moisture, from about 0.3 vol % to about 30 vol % moisture, from about 0.3 vol % to about 25 vol % moisture, from about 0.3 vol % to about 20 vol % moisture, from about 0.3 vol % to about 15 vol % moisture, from about 0.3 vol % to about 10 vol % moisture, from about 0.3 vol % to about 5 vol % moisture, from about 0.3 vol % to about 3 vol % moisture, from about 0.3 vol % to about 1 vol % moisture, from about 0.5 vol % to about 70 vol % moisture, from about 0.5 vol % to about 65 vol % moisture, from about 0.5 vol % to about 60 vol % moisture, from about 0.5 vol % to about 55 vol % moisture, from about 0.5 vol % to about 50 vol % moisture, from about 0.5 vol % to about 45 vol % moisture, from about 0.5 vol % to about 40 vol % moisture, from about 0.5 vol % to about 35 vol % moisture, from about 0.5 vol % to about 30 vol % moisture, from about 0.5 vol % to about 25 vol % moisture, from about 0.5 vol % to about 20 vol % moisture, from about 0.5 vol % to about 15 vol % moisture, from about 0.5 vol % to about 10 vol % moisture, from about 0.5 vol % to about 5 vol % moisture, from about 0.5 vol % to about 3 vol % moisture, from about 0.5 vol % to about 1 vol % moisture, from about 1 vol % to about 70 vol % moisture, from about 1 vol % to about 65 vol % moisture, from about 1 vol % to about 60 vol % moisture, from about 1 vol % to about 55 vol % moisture, from about 1 vol % to about 50 vol % moisture, from about 1 vol % to about 45 vol % moisture, from about 1 vol % to about 40 vol % moisture, from about 1 vol % to about 35 vol % moisture, from about 1 vol % to about 30 vol % moisture, from about 1 vol % to about 25 vol % moisture, from about 1 vol % to about 20 vol % moisture, from about 1 vol % to about 15 vol % moisture, from about 1 vol % to about 10 vol % moisture, from about 1 vol % to about 5 vol % moisture, from about 5 vol % to about 70 vol % moisture, from about 5 vol % to about 65 vol % moisture, from about 5 vol % to about 60 vol % moisture, from about 5 vol % to about 55 vol % moisture, from about 5 vol % to about 50 vol % moisture, from about 5 vol % to about 45 vol % moisture, from about 5 vol % to about 40 vol % moisture, from about 5 vol % to about 35 vol % moisture, from about 5 vol % to about 30 vol % moisture, from about 5 vol % to about 25 vol % moisture, from about 5 vol % to about 20 vol % moisture, from about 5 vol % to about 15 vol % moisture, from about 5 vol % to about 10 vol % moisture, from about 10 vol % to about 70 vol % moisture, from about 10 vol % to about 65 vol % moisture, from about 10 vol % to about 60 vol % moisture, from about 10 vol % to about 55 vol % moisture, from about 10 vol % to about 50 vol % moisture, from about 10 vol % to about 45 vol % moisture, from about 10 vol % to about 40 vol % moisture, from about 10 vol % to about 35 vol % moisture, from about 10 vol % to about 30 vol % moisture, from about 10 vol % to about 25 vol % moisture, from about 10 vol % to about 20 vol % moisture, from about 10 vol % to about 15 vol % moisture, from about 20 vol % to about 70 vol % moisture, from about 20 vol % to about 65 vol % moisture, from about 20 vol % to about 60 vol % moisture, from about 20 vol % to about 55 vol % moisture, from about 20 vol % to about 50 vol % moisture, from about 20 vol % to about 45 vol % moisture, from about 20 vol % to about 40 vol % moisture, from about 20 vol % to about 35 vol % moisture, from about 20 vol % to about 30 vol % moisture, from about 30 vol % to about 70 vol % moisture, from about 30 vol % to about 65 vol % moisture, from about 30 vol % to about 60 vol % moisture, from about 30 vol % to about 55 vol % moisture, from about 30 vol % to about 50 vol % moisture, from about 30 vol % to about 45 vol % moisture, or from about 30 vol % to about 40 vol % moisture.

Further additionally or alternately, the source(s) of mixed gas can (collectively and/or each) comprise at least about 1 vol % $C_1$-$C_3$ hydrocarbons, e.g., at least about 3 vol % $C_1$-$C_3$ hydrocarbons, at least about 5 vol % $C_1$-$C_3$ hydrocarbons, at least about 10 vol % $C_1$-$C_3$ hydrocarbons, at least about 15 vol % $C_1$-$C_3$ hydrocarbons, at least about 20 vol % $C_1$-$C_3$ hydrocarbons, at least about 25 vol % $C_1$-$C_3$ hydrocarbons, at least about 30 vol % $C_1$-$C_3$ hydrocarbons, at least about 35 vol % $C_1$-$C_3$ hydrocarbons, at least about 40 vol % $C_1$-$C_3$ hydrocarbons, at least about 45 vol % $C_1$-$C_3$ hydrocarbons, at least about 50 vol % $C_1$-$C_3$ hydrocarbons, at least about 55 vol % $C_1$-$C_3$ hydrocarbons, at least about 60 vol % $C_1$-$C_3$ hydrocarbons, at least about 65 vol % $C_1$-$C_3$ hydrocarbons, at least about 70 vol % $C_1$-$C_3$ hydrocarbons, or at least about 75 vol % $C_1$-$C_3$ hydrocarbons. Still further additionally or alternately, the source(s) of mixed gas can (collectively and/or each) comprise up to about 99.9 vol % $C_1$-$C_3$ hydrocarbons, e.g., up to about 99.5 vol % $C_1$-$C_3$ hydrocarbons, up to about 99 vol % $C_1$-$C_3$ hydrocarbons, up to about 98 vol % $C_1$-$C_3$ hydrocarbons, up to about 97 vol % $C_1$-$C_3$ hydrocarbons, up to about 96 vol % $C_1$-$C_3$ hydrocarbons, up to about 95 vol % $C_1$-$C_3$ hydrocarbons, up to about 92.5 vol % $C_1$-$C_3$ hydrocarbons, up to about 90 vol % $C_1$-$C_3$ hydrocarbons, up to about 85 vol % $C_1$-$C_3$ hydrocarbons, up to about 80 vol % $C_1$-$C_3$ hydrocarbons, up to about 75 vol % $C_1$-$C_3$ hydrocarbons, up to about 70 vol % $C_1$-$C_3$ hydrocarbons, up to about 65 vol % $C_1$-$C_3$ hydrocarbons, up to about 60 vol % $C_1$-$C_3$ hydrocarbons, up to about 55 vol % $C_1$-$C_3$ hydrocarbons, less than 50 vol % $C_1$-$C_3$ hydrocarbons, up to about 45 vol % $C_1$-$C_3$ hydrocarbons, up to about 40 vol % $C_1$-$C_3$ hydrocarbons, up to about 35 vol % $C_1$-$C_3$ hydrocarbons, up to about 30 vol % $C_1$-$C_3$ hydrocarbons, up to about 25 vol % $C_1$-$C_3$ hydrocarbons, up to about 20 vol % $C_1$-$C_3$ hydrocarbons, up to about 15 vol % $C_1$-$C_3$ hydrocarbons, up to about 10 vol % $C_1$-$C_3$ hydrocarbons, up to about 5.0 vol % $C_1$-$C_3$ hydrocarbons, or up to about 1.0 vol % $C_1$-$C_3$ hydrocarbons.

Yet further additionally or alternately, the source(s) of mixed gas can (collectively and/or each) comprise from about 3 vppm to about 5000 vppm $SO_x$ (e.g., from about 3 vppm to about 3000 vppm $SO_x$, from about 3 vppm to about 2000 vppm $SO_x$, from about 3 vppm to about 1000 vppm $SO_x$, from about 3 vppm to about 500 vppm $SO_x$, from about 3 vppm to about 300 vppm $SO_x$, from about 3 vppm to about 100 vppm $SO_x$, from about 3 vppm to about 75 vppm $SO_x$, from about 3 vppm to about 50 vppm $SO_x$, from about 3 vppm to about 25 vppm $SO_x$, from about 3 vppm to about 10 vppm $SO_x$, from about 5 vppm to about 5000 vppm $SO_x$, from about 5 vppm to about 3000 vppm $SO_x$, from about 5 vppm to about 2000 vppm $SO_x$, from about 5 vppm to about 1000 vppm $SO_x$, from about 5 vppm to about 500 vppm $SO_x$, from about 5 vppm to about 300 vppm $SO_x$, from about 5 vppm to about 100 vppm $SO_x$, from about 5 vppm to about 75 vppm $SO_x$, from about 5 vppm to about 50 vppm $SO_x$, from about 5 vppm to about 25 vppm $SO_x$, from about 5 vppm to about 10 vppm $SO_x$, from about 10 vppm to about 5000 vppm $SO_x$, from about 10 vppm to about 3000 vppm $SO_x$, from about 10 vppm to about 2000 vppm $SO_x$, from about 10 vppm to about 1000 vppm $SO_x$, from about 10 vppm to about 500 vppm $SO_x$, from about 10 vppm to about 300 vppm $SO_x$, from about 10 vppm to about 100 vppm $SO_x$, from about 10 vppm to about 75 vppm $SO_x$, from about 10 vppm to about 50 vppm $SO_x$, from about 10 vppm to about 25 vppm $SO_x$, from about 25 vppm to about 5000 vppm $SO_x$, from about 25 vppm to about 3000 vppm $SO_x$, from about 25 vppm to about 2000 vppm $SO_x$, from about 25 vppm to about 1000 vppm $SO_x$, from about 25 vppm to about 500 vppm $SO_x$, from about 25 vppm to about 300 vppm $SO_x$, from about 25 vppm to about 100 vppm $SO_x$, from about 25 vppm to about 75 vppm $SO_x$, from about 25 vppm to about 50 vppm $SO_x$, from about 50 vppm to about 5000 vppm $SOX$, from about 50 vppm to about 3000 vppm $SO_x$, from about 50 vppm to about 2000 vppm $SO_x$, from about 50 vppm to about 1000 vppm $SO_x$, from about 50 vppm to about 500 vppm $SO_x$, from about 50 vppm to about 300 vppm $SO_x$, from about 50 vppm to about 100 vppm $SO_x$, from about 100 vppm to about 5000 vppm $SO_x$, from about 100 vppm to about 3000 vppm $SO_x$, from about 100 vppm to about 2000 vppm $SO_x$, from about 100 vppm to about 1000 vppm $SO_x$, from about 100 vppm to about 500 vppm $SO_x$, from about 500 vppm to about 5000 vppm $SO_x$, from about 500 vppm to about 3000 vppm $SO_x$, from about 500 vppm to about 2000 vppm $SO_x$, or from about 1000 vppm to about 5000 vppm $SO_x$), from about 3 vppm to about 5000 vppm $NO_x$ (e.g., from about 3 vppm to about 3000 vppm $NO_x$, from about 3 vppm to about 2000 vppm $NO_x$, from about 3 vppm to about 1000 vppm $NO_x$, from about 3 vppm to about 500 vppm $NO_x$, from about 3 vppm to about 300 vppm $NO_x$, from about 3 vppm to about 100 vppm $NO_x$, from about 3 vppm to about 75 vppm $NO_x$, from about 3 vppm to about 50 vppm $NO_x$, from about 3 vppm to about 25 vppm $NO_x$, from about 3 vppm to about 10 vppm $NO_x$, from about 5 vppm to about 5000 vppm $NO_x$, from about 5 vppm to about 3000 vppm $NO_x$, from about 5 vppm to about 2000 vppm $NO_x$, from about 5 vppm to about 1000 vppm $NO_x$, from about 5 vppm to about 500 vppm $NO_x$, from about 5 vppm to about 300 vppm $NO_x$, from about 5 vppm to about 100 vppm $NO_x$, from about 5 vppm to about 75 vppm $NO_x$, from about 5 vppm to about 50 vppm $NO_x$, from about 5 vppm to about 25 vppm $NO_x$, from about 5 vppm to about 10 vppm $NO_x$, from about 10 vppm to about 5000 vppm $NO_x$, from about 10 vppm to about 3000 vppm $NO_x$, from about 10 vppm to about 2000 vppm $NO_x$, from about 10 vppm to about 1000 vppm $NO_x$, from about 10 vppm to about 500 vppm $NO_x$, from about 10 vppm to about 300 vppm $NO_x$, from about 10 vppm to about 100 vppm $NO_x$, from about 10 vppm to about 75 vppm $NO_x$, from about 10 vppm to about 50 vppm $NO_x$, from about 10 vppm to about 25 vppm $NO_x$, from about 25 vppm to about 5000 vppm $NO_x$, from about 25 vppm to about 3000 vppm $NO_x$, from about 25 vppm to about 2000 vppm $NO_x$, from about 25 vppm to about 1000 vppm $NO_x$, from about 25 vppm to about 500 vppm $NO_x$, from about 25 vppm to about 300 vppm $NO_x$, from about 25 vppm to about 100 vppm $NO_x$, from about 25 vppm to about 75 vppm $NO_x$, from about 25 vppm to about 50 vppm $NO_x$, from about 50 vppm to about 5000 vppm $NO_x$, from about 50 vppm to about 3000 vppm $NO_x$, from about 50 vppm to about 2000 vppm $NO_x$, from about 50 vppm to about 1000 vppm $NO_x$, from about 50 vppm to about 500 vppm $NO_x$, from about 50 vppm to about 300 vppm $NO_x$, from about 50 vppm to about 100 vppm $NO_x$, from about 100 vppm to about 5000 vppm $NO_x$, from about 100 vppm to about 3000 vppm $NO_x$, from about 100 vppm to about 2000 vppm $NO_x$, from about 100 vppm to about 1000 vppm $NO_x$, from about 100 vppm to about 500 vppm $NO_x$, from about 500 vppm to about 5000 vppm $NO_x$, from about 500 vppm to about 3000 vppm $NO_x$, from about 500 vppm to about 2000 vppm $NO_x$, or from about 1000 vppm to about 5000 vppm $NO_x$), from about 0.1 vol % to less than 50 vol % $H_2$ (e.g., from about 0.1 vol % to about 45 vol % $H_2$, from about 0.1 vol % to about 40 vol % $H_2$, from about 0.1 vol % to about 35 vol % $H_2$, from about 0.1 vol % to about 30 vol % $H_2$, from about 0.1 vol % to about 25 vol % $H_2$, from about 0.1 vol % to about 20 vol % $H_2$, from about 0.1 vol % to about 15 vol % $H_2$, from about 0.1 vol % to about 10 vol % $H_2$, from about 0.1 vol % to about 5 vol % $H_2$, from about 0.1 vol % to about 3 vol % $H_2$, from about 0.1 vol % to about 1 vol % $H_2$, from about 0.3 vol % to less than 50 vol % $H_2$, from about 0.3 vol % to about 45 vol % $H_2$, from about 0.3 vol % to about 40 vol % $H_2$, from about 0.3 vol % to about 35 vol % $H_2$, from about 0.3 vol % to about 30 vol % $H_2$, from about 0.3 vol % to about 25 vol % H$_2$, from about 0.3 vol % to about 20 vol % H$_2$, from about 0.3 vol % to about 15 vol % H$_2$, from about 0.3 vol % to about 10 vol % H$_2$, from about 0.3 vol % to about 5 vol % H$_2$, from about 0.3 vol % to about 3 vol % H$_2$, from about 0.3 vol % to about 1 vol % H$_2$, from about 0.5 vol % to less than 50 vol % H$_2$, from about 0.5 vol % to about 45 vol % H$_2$, from about 0.5 vol % to about 40 vol % H$_2$, from about 0.5 vol % to about 35 vol % H$_2$, from about 0.5 vol % to about 30 vol % H$_2$, from about 0.5 vol % to about 25 vol % H$_2$, from about 0.5 vol % to about 20 vol % H$_2$, from about 0.5 vol % to about 15 vol % H$_2$, from about 0.5 vol % to about 10 vol % H$_2$, from about 0.5 vol % to about 5 vol % H$_2$, from about 0.5 vol % to about 3 vol % H$_2$, from about 0.5 vol % to about 1 vol % H$_2$, from about 1 vol % to less than 50 vol % H$_2$, from about 1 vol % to about 45 vol % H$_2$, from about 1 vol % to about 40 vol % H$_2$, from about 1 vol % to about 35 vol % H$_2$, from about 1 vol % to about 30 vol % H$_2$, from about 1 vol % to about 25 vol % H$_2$, from about 1 vol % to about 20 vol % H$_2$, from about 1 vol % to about 15 vol % H$_2$, from about 1 vol % to about 10 vol % H$_2$, from about 1 vol % to about 5 vol % H$_2$, from about 1 vol % to about 3 vol % H$_2$, from about 3 vol % to less than 50 vol % H$_2$, from about 3 vol % to about 45 vol % H$_2$, from about 3 vol % to about 40 vol % H$_2$, from about 3 vol % to about 35 vol % H$_2$, from about 3 vol % to about 30 vol % H$_2$, from about 3 vol % to about 25 vol % H$_2$, from about 3 vol % to about 20 vol % H$_2$, from about 3 vol % to about 15 vol % H$_2$, from about 3 vol % to about 10 vol % H$_2$, from about 3 vol % to about 5 vol % H$_2$, from about 5 vol % to less than 50 vol % H$_2$, from about 5 vol % to about 45 vol % H$_2$, from about 5 vol % to about 40 vol % H$_2$, from about 5 vol % to about 35 vol % H$_2$, from about 5 vol % to about 30 vol % H$_2$, from about 5 vol % to about 25 vol % H$_2$, from about 5 vol % to about 20 vol % H$_2$, from about 5 vol % to about 15 vol % H$_2$, from about 5 vol % to about 10 vol % H$_2$, from about 10 vol % to less than 50 vol % H$_2$, from about 10 vol % to about 45 vol % H$_2$, from about 10 vol % to about 40 vol % H$_2$, from about 10 vol % to about 35 vol % H$_2$, from about 10 vol % to about 30 vol % H$_2$, from about 10 vol % to about 25 vol % H$_2$, from about 10 vol % to about 20 vol % H$_2$, or from about 20 vol % to less than 50 vol % H$_2$), from about 3 vppm to about 10000 vppm H$_2$S (e.g., from about 3 vppm to about 7500 vppm H$_2$S, from about 3 vppm to about 5000 vppm H$_2$S, from about 3 vppm to about 2500 vppm H$_2$S, from about 3 vppm to about 1000 vppm H$_2$S, from about 3 vppm to about 500 vppm H$_2$S, from about 3 vppm to about 250 vppm H$_2$S, from about 3 vppm to about 100 vppm H$_2$S, from about 3 vppm to about 75 vppm H$_2$S, from about 3 vppm to about 50 vppm H$_2$S, from about 3 vppm to about 25 vppm H$_2$S, from about 3 vppm to about 10 vppm H$_2$S, from about 5 vppm to about 10000 vppm H$_2$S, from about 5 vppm to about 7500 vppm H$_2$S, from about 5 vppm to about 5000 vppm H$_2$S, from about 5 vppm to about 2500 vppm H$_2$S, from about 5 vppm to about 1000 vppm H$_2$S, from about 5 vppm to about 500 vppm H$_2$S, from about 5 vppm to about 250 vppm H$_2$S, from about 5 vppm to about 100 vppm H$_2$S, from about 5 vppm to about 75 vppm H$_2$S, from about 5 vppm to about 50 vppm H$_2$S, from about 5 vppm to about 25 vppm H$_2$S, from about 5 vppm to about 10 vppm H$_2$S, from about 10 vppm to about 10000 vppm H$_2$S, from about 10 vppm to about 7500 vppm H$_2$S, from about 10 vppm to about 5000 vppm H$_2$S, from about 10 vppm to about 2500 vppm H$_2$S, from about 10 vppm to about 1000 vppm H$_2$S, from about 10 vppm to about 500 vppm H$_2$S, from about 10 vppm to about 250 vppm H$_2$S, from about 10 vppm to about 100 vppm H$_2$S, from about 10 vppm to about 75 vppm H$_2$S, from about 10 vppm to about 50 vppm H$_2$S, from about 10 vppm to about 25 vppm H$_2$S, from about 25 vppm to about 10000 vppm H$_2$S, from about 25 vppm to about 7500 vppm H$_2$S, from about 25 vppm to about 5000 vppm H$_2$S, from about 25 vppm to about 2500 vppm H$_2$S, from about 25 vppm to about 1000 vppm H$_2$S, from about 2 vppm to about 500 vppm H$_2$S, from about 25 vppm to about 250 vppm H$_2$S, from about 25 vppm to about 100 vppm H$_2$S, from about 25 vppm to about 75 vppm H$_2$S, from about 25 vppm to about 50 vppm H$_2$S, from about 50 vppm to about 10000 vppm H$_2$S, from about 50 vppm to about 7500 vppm H$_2$S, from about 50 vppm to about 5000 vppm H$_2$S, from about 50 vppm to about 2500 vppm H$_2$S, from about 50 vppm to about 1000 vppm H$_2$S, from about 50 vppm to about 500 vppm H$_2$S, from about 50 vppm to about 250 vppm H$_2$S, from about 50 vppm to about 100 vppm H$_2$S, from about 50 vppm to about 75 vppm H$_2$S, from about 75 vppm to about 10000 vppm H$_2$S, from about 100 vppm to about 10000 vppm H$_2$S, from about 100 vppm to about 7500 vppm H$_2$S, from about 100 vppm to about 5000 vppm H$_2$S, from about 100 vppm to about 2500 vppm H$_2$S, from about 100 vppm to about 1000 vppm H$_2$S, from about 100 vppm to about 500 vppm H$_2$S, from about 100 vppm to about 250 vppm H$_2$S, from about 500 vppm to about 10000 vppm H$_2$S, from about 500 vppm to about 7500 vppm H$_2$S, from about 500 vppm to about 5000 vppm H$_2$S, from about 500 vppm to about 2500 vppm H$_2$S, from about 500 vppm to about 1000 vppm H$_2$S, from about 1000 vppm to about 10000 vppm H$_2$S, from about 1000 vppm to about 5000 vppm H$_2$S, from about 1000 vppm to about 2500 vppm H$_2$S, from about 2500 vppm to about 10000 vppm H$_2$S, from about 2500 vppm to about 5000 vppm H$_2$S, or from about 5000 vppm to about 10000 vppm H$_2$S), and/or from about 5 vppm to about 25 vol % CO (e.g., from about 5 vppm to about 20 vol % CO, from about 5 vppm to about 10 vol % CO, from about 5 vppm to about 5 vol % CO, from about 5 vppm to about 3 vol % CO, from about 5 vppm to about 2 vol % CO, from about 5 vppm to about 1 vol % CO, from about 5 vppm to about 5000 vppm CO, from about 5 vppm to about 3000 vppm CO, from about 5 vppm to about 1000 vppm CO, from about 5 vppm to about 500 vppm CO, from about 5 vppm to about 300 vppm CO, from about 5 vppm to about 100 vppm CO, from about 5 vppm to about 50 vppm CO, from about 10 vppm to about 25 vol % CO, from about 10 vppm to about 20 vol % CO, from about 10 vppm to about 10 vol % CO, from about 10 vppm to about 5 vol % CO, from about 10 vppm to about 3 vol % CO, from about 10 vppm to about 2 vol % CO, from about 10 vppm to about 1 vol % CO, from about 10 vppm to about 5000 vppm CO, from about 10 vppm to about 3000 vppm CO, from about 10 vppm to about 1000 vppm CO, from about 10 vppm to about 500 vppm CO, from about 10 vppm to about 300 vppm CO, from about 10 vppm to about 100 vppm CO, from about 10 vppm to about 50 vppm CO, from about 50 vppm to about 25 vol % CO, from about 50 vppm to about 20 vol % CO, from about 50 vppm to about 10 vol % CO, from about 50 vppm to about 5 vol % CO, from about 50 vppm to about 3 vol % CO, from about 50 vppm to about 2 vol % CO, from about 50 vppm to about 1 vol % CO, from about 50 vppm to about 5000 vppm CO, from about 50 vppm to about 3000 vppm CO, from about 50 vppm to about 1000 vppm CO, from about 50 vppm to about 500 vppm CO, from about 50 vppm to about 300 vppm CO, from about 50 vppm to about 100 vppm CO, from about 100 vppm to about 25 vol % CO, from about 100 vppm to about 20 vol % CO, from about 100 vppm to about 10 vol % CO, from about 100 vppm to about 5 vol % CO, from about 100 vppm to about 3 vol % CO, from about 100 vppm to about 2 vol % CO, from about 100 vppm to about 1 vol % CO, from about 100 vppm to about 5000 vppm CO, from about 100 vppm to about 3000 vppm CO, from about 100 vppm to about 1000 vppm CO, from about 100 vppm to about 500 vppm CO, from about 500 vppm to about 25 vol % CO, from about 500 vppm to about 20 vol % CO, from about 500 vppm to about 10 vol % CO, from about 500 vppm to about 5 vol % CO, from about 500 vppm to about 3 vol % CO, from about 500 vppm to about 2 vol % CO, from about 500 vppm to about 1 vol % CO, from about 500 vppm to about 5000 vppm CO, from about 500 vppm to about 3000 vppm CO, from about 500 vppm to about 1000 vppm CO, from about 1000 vppm to about 25 vol % CO, from about 1000 vppm to about 20 vol % CO, from about 1000 vppm to about 10 vol % CO, from about 1000 vppm to about 5 vol % CO, from about 1000 vppm to about 3 vol % CO, from about 1000 vppm to about 2 vol % CO, from about 1000 vppm to about 1 vol % CO, from about 1000 vppm to about 5000 vppm CO, from about 1000 vppm to about 3000 vppm CO, from about 5000 vppm to about 25 vol % CO, from about 5000 vppm to about 20 vol % CO, from about 5000 vppm to about 10 vol % CO, from about 5000 vppm to about 5 vol % CO, from about 5000 vppm to about 3 vol % CO, from about 5000 vppm to about 2 vol % CO, from about 5000 vppm to about 1 vol % CO, from about 1 vol % to about 25 vol % CO, from about 1 vol % to about 20 vol % CO, from about 1 vol % to about 10 vol % CO, from about 1 vol % to about 5 vol % CO, or from about 1 vol % to about 3 vol % CO).

In many embodiments, the source(s) of mixed gas can (collectively and/or each) comprise at least one (or perhaps all) of the following: from about 1 vol % to about 25 vol % $CO_2$ and from about 0.5 vol % to about 20 vol % moisture; from about 10 vol % to about 45 vol % $CO_2$ and at least about 10 vol % $C_1$-$C_3$ hydrocarbons; from about 5 vppm to about 1000 vppm $SO_x$; from about 5 vppm to about 1000 vppm $NO_x$; from about 1 vol % to about 40 vol % $H_2$; from about 10 vppm to about 4000 vppm $H_2S$; and from about 50 vppm to about 5 vol % CO.

Alternately, in embodiments where one or more of the solid monolithic sorbent is especially sensitive to the presence of one or more of $SO_x$, $NO_x$, $H_2S$, and CO (e.g., where such component(s) substantially shorten(s) sorbent useful life, substantially reduce(s) sorbent activity, substantially reduce(s) sorbent selectivity for the target gas component(s), substantially detrimentally affect(s) sorbent structural and/or chemical stability, or the like, or a combination thereof), the individual content of the sensitive compound(s) in the collective mixed gas source can be, or can be pre-treated to be, about 50 vppm or less, e.g., about 40 vppm or less, about 30 vppm or less, about 20 vppm or less, about 10 vppm or less, about 7 vppm or less, about 5 vppm or less, about 3 vppm or less, about 2 vppm or less, about 1 vppm or less, about 750 vppb or less, about 500 vppb or less, about 250 vppb or less, about 100 vppb or less, about 75 vppb or less, about 50 vppb or less, or about 25 vppb or less. In such alternate component-sensitive embodiments, though there may not necessarily be a lower limit on each sensitive component content, it can be practically very difficult to achieve (and/or to experimentally measure) contents below about 10 vppb. A non-limiting example of a $SO_x$-sensitive sorbent material can include solid/grafted amine sorbents, or sorbents having a functionality exhibiting Lewis basicity, such as containing a nitrogen atom with a lone pair of electrons.

Instead of characterizing the source(s) of mixed gas by the relative contents of their (respective/collective) components, they can additionally or alternatively be characterized by their origin. For example, the source(s) of mixed gas can collectively and/or each include (or be comprised of) a petroleum refinery flue gas stream, product and/or waste from a coal-burning power plant, a water gas shift process product stream, a hydrocarbon conversion catalyst regeneration gas, a hydrocarbon combustion gas product stream, a virgin or partially treated natural gas stream, or a combination thereof.

A dual phase sorption feedstream can be provided by combining one or more of the sources of mixed gas with liquid phase water, preferably in the form of relatively fine droplets, such that the combination of all of the mixed gas sources and the liquid phase water droplets together form the dual phase sorption feedstream. Thus, the dual phase sorption feedstream according to the invention can contain at least $CO_2$ and $H_2O$. Although the addition of the liquid phase water droplets can be undertaken at any temperature, when the mixed gas source(s) are (collectively) at a feed temperature, the liquid phase water droplets can simply be added at approximately the feed temperature for convenience—in any event, whatever the original temperature of the (collective) mixed gas source(s), the temperature of the dual phase sorption feedstream is defined herein to be approximately at the feed temperature. Advantageously, the amount of liquid phase water droplets added to the mixed gas source(s) can be sufficient to cause the resultant dual phase sorption feedstream to have at least 90% moisture content (e.g., at least 95% moisture content, at least 99% moisture content, at least 99.5 vol % moisture content, at least 99.9 vol % moisture content, at least 99.95 vol % moisture content, at least 99.99 vol % moisture content, or at least 100 vol % saturated with moisture content—the dual phase sorption feedstream can optionally be supersaturated with water vapor, meaning greater than 100 vol % moisture content) at the temperature at which desorption is eventually undertaken (which desorption temperature can typically be higher than the feed temperature in TSA-type processes), and also usually at the (typically lower) feed temperature. Additionally or alternately, the dual phase sorption feedstream according to the invention can have at least $CO_2$ and $H_2O$ in the gas phase and some $H_2O$ in the liquid phase at the desorption (and optionally also at the feed) temperature(s). It should be understood that, although less preferred, there is the distinct possibility (particularly in relatively low moisture content mixed gas sources) that substantially all the liquid phase water can be drawn into the gas phase and yet the increased moisture content mixed stream that is entirely in the gas phase can still function in the same manner as the dual phase sorption feedstream in facilitating the achievement of a faster moving thermal wave than sorption wave through the sorbent material (e.g., through substantial increase of the effective heat capacity of the mixed gas source stream(s), even without the added evaporative cooling aspect of the liquid phase water).

The nature of the solid monolithic sorbent can vary, depending upon the specific desired component(s) to be controlled, separated, and/or purified. In many embodiments, the solid monolithic sorbent can comprise or be formed from: an alkalized alumina; an alkalized titania; activated carbon; 13X or 5A molecular sieve; a mesoporous molecular sieve material such as MCM-48; a zeolite having framework structure type AEI, AFT, AFX, ATN, AWW, CHA, DDR, EPI, ESV, FAU, KFI, LEV, LTA, PHI, RHO, SAV, or a combination or intergrowth thereof; a cationic zeolite material; a metal oxide whose metal(s) include(s) an alkali metal, an alkaline earth metal, a transition metal, or a combination thereof: a zeolite imidazolate framework (ZIF) material; a metal organic framework (MOF) material; or a combination thereof. In one embodiment where carbon dioxide is to be separated from a mixed gas containing at least carbon dioxide, some $C_1$-$C_3$ hydrocarbons, and some moisture, the solid monolithic sorbent can be formed from an alkalized alumina. Additionally or alternately, the solid monolithic sorbent used in methods according to the invention can be functionalized (e.g., on one or more surfaces exposed to the carbon oxide-containing gas flow) with sorbent functional groups, including chemisorptive functional groups such as primary and/or secondary amines.

Despite $H_2O$ being an additional potential sensitivity for certain sorbent compositions, the deliberate presence of more than a modicum of moisture in the mixed gas source(s) means that the sorbent material should generally be at least $H_2O$-tolerant, if not $H_2O$-resistant, in that the moisture content of the mixed gas source(s) should not significantly degrade the sorbent material so as to render its repeated use impossible or too impractical. Additionally or alternately, it could be preferable for the sorbent material used in the methods according to the present invention to have a $CO_2/H_2O$ sorption selectivity of at least 5, e.g., at least about 8, at least about 10, at least about 12, at least about 15, or at least about 20, e.g., so that $H_2O$ does not effectively compete for sorption sites with $CO_2$ on an equilibrium basis (in other words, so that that $CO_2$ sorption capacity is not significantly reduced by the presence of the additional water vapor in the system), thus frustrating an integral purpose of the $CO_2$ sorption methods according to the invention.

The sorption-desorption process can typically include at least the following steps: $CO_2$ sorption; $CO_2$ desorption; and optionally at most partial sorbent cooling, which, if present, is separate from carbon oxide sorption. However, in any event, the sorption-desorption process according to the present invention can advantageously include no drying step (as moisture and liquid phase water is particularly desired) and, in certain embodiments, can occasionally include no separate sorbent cooling step (particularly where the cooling step can be combined with the $CO_2$ sorption step). Though these steps are detailed in an order from first to last, it should be understood that this is only for convenience of explanation and is not meant to unduly limit the present invention; for instance, as described further herein, the stated order of these steps from first to last is not necessarily the order in which they would occur in the methods according to the invention.

In the $CO_2$ sorption step, the dual phase sorption feedstream, which comprises the combination of the mixed gas source(s) containing $CO_2$ and liquid phase water, which feedstream can advantageously be approximately at the feed temperature, can be exposed to the solid monolithic sorbent (across its thickness), which is at the desorption temperature (which desorption temperature, in TSA-type processes, can be higher, e.g., at least about 10° C. higher, at least about 15° C. higher, at least about 20° C. higher, at least about 25° C. higher, at least about 30° C. higher, at least about 35° C. higher, at least about 40° C. higher, at least about 45° C. higher, or at least about 50° C. higher than the feed temperature; additionally or alternately which desorption temperature can be no more than about 140° C. higher, e.g. no more than about 120° C. higher, no more than about 100° C. higher, no more than about 90° C. higher, no more than about 85° C. higher, no more than about 80° C. higher, no more than about 75° C. higher, no more than about 70° C. higher, no more than about 65° C. higher, no more than about 60° C. higher, no more than about 55° C. higher, no more than about 50° C. higher, no more than about 45° C. higher, no more than about 40° C. higher, no more than about 35° C. higher, no more than about 30° C. higher, no more than about 25° C. higher, or no more than about 20° C. higher) than the feed temperature, the contacting occurring as well as under further conditions sufficient for the solid monolithic sorbent to selectively sorb $CO_2$. As a result, a selectively $CO_2$-sorbed solid monolithic sorbent can be formed, along with a selectively $CO_2$-depleted product stream.

In the carbon oxide sorption step, the solid monolithic sorbent can optionally but advantageously have a $CO_2/N_2$ selectivity at the operating conditions in the sorption step of at least 2, e.g., at least 3, at least 4, at least 5, at least 7, at least 10, at least 15, at least 20, at least 25, at least 30, at least 50, at least 75, at least 100, at least 200, at least 300, at least 400, at least 500, at least 750, or at least 1000. Additionally or alternately, the solid monolithic sorbents can optionally but advantageously have a $CO_2/N_2$ selectivity at the operating conditions in the sorption step of up to 10000. e.g., up to 7500, up to 5000, up to 3000, up to 2500, up to 2000, up to 1500, up to 1000, up to 750, up to 500, up to 300, up to 250, up to 200, up to 150, up to 100, up to 75, up to 50, up to 30, up to 25, up to 20, up to 15, or up to 10.

In the $CO_2$ sorption step, the solid monolithic sorbent can optionally have a $CO_2/CH_4$ selectivity at the operating conditions in the sorption step of at least 2. e.g., at least 3, at least 4, at least 5, at least 7, at least 10, at least 15, at least 20, at least 25, at least 30, at least 50, at least 75, at least 100, at least 200, at least 300, at least 400, at least 500, at least 750, or at least 1000. Additionally or alternatively, the solid monolithic sorbent can optionally have a $CO_2/CH_4$ selectivity at the operating conditions in the sorption step of up to 10000, e.g., up to 7500, up to 5000, up to 3000, up to 2500, up to 2000, up to 1500, up to 1000, up to 750, up to 500, up to 300, up to 250, up to 200, up to 150, up to 100, up to 75, up to 50, up to 30, up to 25, up to 20, up to 15, or up to 10.

In the carbon oxide desorption step, the selectively $CO_2$-sorbed solid monolithic sorbent can be exposed (across its thickness) to a stripping stream, which contains moisture and which is at a stripping temperature that can be at least about 15° C. higher (e.g., at least about 20° C. higher, at least about 25° C. higher, at least about 30° C. higher, at least about 35° C. higher, at least about 40° C. higher, at least about 45° C. higher, at least about 50° C. higher, at least about 55° C. higher, at least about 60° C. higher, at least about 65° C. higher, at least about 70° C. higher, at least about 75° C. higher, at least about 80° C. higher, at least about 85° C. higher, at least about 90° C. higher, at least about 95° C. higher, or at least about 100° C. higher than the feed temperature; additionally or alternately no more than about 140° C. higher, e.g., no more than about 120° C. higher, no more than about 100° C. higher, no more than about 90° C. higher, no more than about 85° C. higher, no more than about 80° C. higher, no more than about 75° C. higher, no more than about 70° C. higher, no more than about 65° C. higher, no more than about 60° C. higher, no more than about 55° C. higher, no more than about 50° C. higher, no more than about 45° C. higher, no more than about 40° C. higher, no more than about 35° C. higher, or no more than about 30° C. higher) than the feed temperature. As a result, a $CO_2$-desorbed monolithic sorbent can be formed, along with a stripped product stream containing desorbed $CO_2$ and a lower moisture content than that of the stripped product stream. It should be understood that this stripping stream can be co-current to the flow of the dual feed sorption feedstream or counter-current, as desired; so long as the sorption and desorption steps are performed in a manner countercurrent to the movement of the solid monolithic sorbent material, the process as a whole can be described as a counter-current process. In one embodiment, the stripping stream can be co-current to the sorption step flow. In an alternative embodiment, the stripping stream can be counter-current to the sorption step flow.

The stripping stream can typically contain moisture and a relatively low $CO_2$ content (preferably not more than about 2 vol % $CO_2$, e.g., not more than about 1 vol % $CO_2$, not more than about 5000 vppm $CO_2$, not more than about 3000 vppm $CO_2$, not more than about 2000 vppm $CO_2$, not more than about 1000 vppm $CO_2$, not more than about 750 vppm $CO_2$, not more than about 500 vppm $CO_2$, not more than about 300 vppm $CO_2$, not more than about 200 vppm $CO_2$, not more than about 100 vppm $CO_2$, not more than about 75 vppm $CO_2$, not more than about 50 vppm $CO_2$, not more than about 30 vppm $CO_2$, not more than about 20 vppm $CO_2$, or not more than about 10 vppm $CO_2$) to facilitate further desorption of $CO_2$.

Where an optional sorbent cooling step is necessary and/or desired, it should function to at most only partially cool the $CO_2$-desorbed monolithic sorbent, meaning that an upstream (or front-most) portion of the thickness can be exposed to a (co-current) cooling stream for a time and under conditions sufficient to cool only that portion of the thickness of the solid monolithic sorbent to a desired temperature below the stripping temperature (e.g., at least about 5° C. lower, at least about 7° C. lower, at least about 10° C. lower, at least about 15° C. lower, at least about 20° C. lower, at least about 25° C. lower, at least about 30° C. lower, at least about 35° C. lower, at least about 40° C. lower, at least about 45° C. lower, at least about 50° C. lower, at least about 55° C. lower, at least about 60° C. lower, at least about 65° C. lower, at least about 70° C. lower, at least about 75° C. lower, at least about 80° C. lower, at least about 85° C. lower, at least about 90° C. lower, at least about 95° C. lower, or at least about 100° C. lower than the stripping temperature, and/or to approximately the feed temperature; additionally or alternately to no more than about 140° C. lower, e.g., no more than about 120° C. lower, no more than about 100° C. lower, no more than about 90° C. lower, no more than about 85° C. lower, no more than about 80° C. lower, no more than about 75° C. lower, no more than about 70° C. lower, no more than about 65° C. lower, no more than about 60° C. lower, no more than about 55° C. lower, no more than about 50° C. lower, no more than about 45° C. lower, no more than about 40° C. lower, no more than about 35° C. lower, no more than about 30° C. lower, no more than about 25° C. lower, no more than about 20° C. lower, no more than about 15° C. lower, or no more than about 10° C. lower than the stripping temperature, and/or to approximately the feed temperature). Since the optional cooling step is at most only partial, it should be understood that this can be manifest as a partial cooling of the entire sorbent, e.g., to a temperature between that of the stripping temperature and the feed temperature, and/or to a cooling of a portion of the thickness of the solid monolithic sorbent, which can be less than the entire thickness, and indeed can advantageously be at most 60% of the thickness of the solid monolithic sorbent (e.g., at most 50% of the thickness, at most 45% of the thickness, at most 40% of the thickness, at most 35% of the thickness, at most 30% of the thickness, at most 25% of the thickness, or at most 20% of the thickness; additionally or alternately, when the optional cooling step is present, the portion of the sorbent to be cooled can comprise at least 5% of the thickness, e.g., at least 10% of the thickness).

In such situations where the optional at most partial cooling step is employed, the partial cooling of the sorbent (whether that means cooling the sorbent to a temperature below the stripping temperature but still above the feed temperature or cooling only a portion of the thickness of the sorbent or indeed some combination thereof) can be seen as causing the leading edge of the thermal wave to start at a position within the thickness of the sorbent corresponding to the portion of the thickness of the sorbent that was cooled. In such circumstances, the thermal wave can pass across the thickness of the sorbent only as fast as, or even slower than (but not too much slower than), the $CO_2$ sorption wave, and yet, due to the partial cooling step, the leading edge of the thermal wave that has a head start can still pass across the thickness of the sorbent in a position downstream from the leading edge of the $CO_2$ sorption wave.

Obviously, as the methods according to the present invention are envisioned to be continuous (or at least semi-continuous), this sorption-desorption cycle can advantageously be repeated.

As the $CO_2$ sorption by a typical sorbent material can generally be exothermic, the solid monolithic sorbent can be locally heated in the area where selective $CO_2$ sorption is occurring. However, the presence of the liquid phase water in the dual phase sorption feed can function to counteract the heat (a) resulting from the sorption exotherm and/or (b) resulting from the desorption temperature being greater than the feed temperature, e.g., by phase change (i.e., from liquid phase water to gas phase water vapor, also called evaporative cooling). Though the gas phase components are also capable of sorbing some of the heat, their heat capacities are far inferior to liquid phase water droplets, as the phase change from liquid to gas can simultaneously cool the sorbent during the sorption step, thus allowing elimination or reduction of completion/severity of a separate cooling step in the continuous or semi-continuous sorption-desorption process. Whether the separate cooling step can be partially or completely eliminated from the sorption-desorption process can depend on the relative speeds with which the leading edge of a thermal wave passes across the thickness of the sorbent, in comparison to the leading edge of a $CO_2$ sorption wave passing across the same thickness of the sorbent.

In the $CO_2$ sorption step, which can typically be exothermic and selectively sorptive for $CO_2$, the exposing of the dual phase sorption feedstream to the solid monolithic sorbent can result in a thermal wave, having a leading edge, passing across the thickness of the sorbent and simultaneously in a $CO_2$ sorption wave, having a leading edge, passing across the thickness of the sorbent. In one preferred embodiment, where the thermal wave passes across the thickness of the sorbent faster than the $CO_2$ sorption wave, there may be no need for a separate cooling step in the sorption-desorption process, and thus, most preferably in these situations, the sorption-desorption process can advantageously contain no separate cooling step, as the liquid phase water can serve to effectively cool the sorbent at a faster rate than the exothermic $CO_2$ sorption (and any other sources of increased heat) can introduce heat to the process.

However, there can alternately be situations where the thermal wave does not pass across the thickness of the sorbent faster than the $CO_2$ sorption wave. Nevertheless, even in such embodiments, as long as the leading edge of the thermal wave propagates across the thickness of the sorbent in a position downstream (i.e., at a point further through the thickness, in the direction of sorptive flow) from the leading edge of the $CO_2$ sorption wave, the same goal can be accomplished—this can result in situations where the whole sorbent can be partially cooled to a temperature less than the stripping temperature but greater than the feed temperature, where only a portion (e.g., an upstream portion) of the sorbent can be (partially or completely) cooled (to a temperature less than the stripping temperature but greater than the feed temperature, or alternately to approximately the feed temperature, respectively), or a combination thereof, thus allowing the thermal and sorptive waves to proceed across the sorbent thickness at roughly the same speed or even at a slightly slower speed, but in any event at a speed that allows the leading edge of the thermal wave to always outpace the position, in the flow direction, of the leading edge of the $CO_2$ adsorptive wave.

In an optional embodiment, moisture from the stripped product stream can be condensed as water, thus forming a condensed product stream and thereby increasing $CO_2$ purity in the condensed product stream. Either or both of these streams can optionally be further processed, if desired, and/or can optionally be used, in whole or in part, as an integration with one or more chemical, refinery, $CO_2$ sequestration, gas production, and/or other industrial/commercial process.

In certain embodiments, the cyclic sorption-desorption process can have an average total cycle time from about 30 seconds to about 720 minutes, e.g., from about 30 seconds to about 600 minutes, from about 30 seconds to about 480 minutes, from about 30 seconds to about 360 minutes, from about 30 seconds to about 240 minutes, from about 30 seconds to about 180 minutes, from about 30 seconds to about 120 minutes, from about 30 seconds to about 90 minutes, from about 30 seconds to about 60 minutes, from about 30 seconds to about 45 minutes, from about 30 seconds to about 30 minutes, from about 30 seconds to about 20 minutes, from about 30 seconds to about 15 minutes, from about 30 seconds to about 10 minutes, from about 30 seconds to about 5 minutes, from about 1 minute to about 720 minutes, from about 1 minute to about 600 minutes, from about 1 minute to about 480 minutes, from about 1 minute to about 360 minutes, from about 1 minute to about 240 minutes, from about 1 minute to about 180 minutes, from about 1 minute to about 120 minutes, from about 1 minute to about 90 minutes, from about 1 minute to about 60 minutes, from about 1 minute to about 45 minutes, from about 1 minute to about 30 minutes, from about 1 minute to about 20 minutes, from about 1 minute to about 15 minutes, from about 1 minute to about 10 minutes, from about 1 minute to about 5 minutes, from about 3 minutes to about 720 minutes, from about 3 minutes to about 600 minutes, from about 3 minutes to about 480 minutes, from about 3 minutes to about 360 minutes, from about 3 minutes to about 240 minutes, from about 3 minutes to about 180 minutes, from about 3 minutes to about 120 minutes, from about 3 minutes to about 90 minutes, from about 3 minutes to about 60 minutes, from about 3 minutes to about 45 minutes, from about 3 minutes to about 30 minutes, from about 3 minutes to about 20 minutes, from about 3 minutes to about 15 minutes, from about 3 minutes to about 10 minutes, from about 5 minutes to about 720 minutes, from about 5 minutes to about 600 minutes, from about 5 minutes to about 480 minutes, from about 5 minutes to about 360 minutes, from about 5 minutes to about 240 minutes, from about 5 minutes to about 180 minutes, from about 5 minutes to about 120 minutes, from about 5 minutes to about 90 minutes, from about 5 minutes to about 60 minutes, from about 5 minutes to about 45 minutes, from about 5 minutes to about 30 minutes, from about 5 minutes to about 20 minutes, from about 5 minutes to about 15 minutes, from about 5 minutes to about 10 minutes, from about 10 minutes to about 720 minutes, from about 10 minutes to about 600 minutes, from about 10 minutes to about 480 minutes, from about 10 minutes to about 360 minutes, from about 10 minutes to about 240 minutes, from about 10 minutes to about 180 minutes, from about 10 minutes to about 120 minutes, from about 10 minutes to about 90 minutes, from about 10 minutes to about 60 minutes, from about 10 minutes to about 45 minutes, from about 10 minutes to about 30 minutes, from about 10 minutes to about 20 minutes, from about 15 minutes to about 720 minutes, from about 15 minutes to about 600 minutes, from about 15 minutes to about 480 minutes, from about 15 minutes to about 360 minutes, from about 15 minutes to about 240 minutes, from about 15 minutes to about 180 minutes, from about 15 minutes to about 120 minutes, from about 15 minutes to about 90 minutes, from about 15 minutes to about 60 minutes, from about 15 minutes to about 45 minutes, from about 15 minutes to about 30 minutes, from about 20 minutes to about 720 minutes, from about 20 minutes to about 600 minutes, from about 20 minutes to about 480 minutes, from about 20 minutes to about 360 minutes, from about 20 minutes to about 240 minutes, from about 20 minutes to about 180 minutes, from about 20 minutes to about 120 minutes, from about 20 minutes to about 90 minutes, from about 20 minutes to about 60 minutes, from about 20 minutes to about 45 minutes, from about 20 minutes to about 30 minutes, from about 30 minutes to about 720 minutes, from about 30 minutes to about 600 minutes, from about 30 minutes to about 480 minutes, from about 30 minutes to about 360 minutes, from about 30 minutes to about 240 minutes, from about 30 minutes to about 180 minutes, from about 30 minutes to about 120 minutes, from about 30 minutes to about 90 minutes, from about 30 minutes to about 60 minutes, or from about 30 minutes to about 45 minutes.

In most embodiments, the conditions sufficient for the $CO_2$ desorption step can include a pressure swing/reduction, a temperature swing/increase, or both. As such, the cyclic sorption-desorption methods according to the invention can involve PSA, rapid cycle PSA (RCPSA), TSA, rapid cycle TSA (RCTSA), a combination of pressure and temperature swings (PTSA), a partial pressure swing (PPSA), or the like, or some combination or integration thereof. In embodiments where rapid cycles are desired/utilized, the average total cycle time can be no more than about 1 minute, e.g., no more than about 45 seconds, no more than about 30 seconds, no more than about 20 seconds, no more than about 15 seconds, no more than about 10 seconds, or no more than about 5 seconds (and, though no lower limit is specified, it can be impractical in some embodiments for solid monolithic sorbents to undergo an average total cycle time less than about 1 second).

In many embodiments, the total pressure conditions in the $CO_2$ sorption step, in the $CO_2$ desorption step, and/or in the optional at most partial cooling step, can collectively range from about 0.01 psia (about 0.07 kPaa) to about 300 psia (about 2.0 MPaa), e.g., from about 0.01 psia (about 0.07 kPaa) to about 200 psia (about 1.4 MPaa), from about 0.01 psia (about 0.07 kPaa) to about 150 psia (about 1.0 MPaa), from about 0.01 psia (about 0.07 kPaa) to about 100 psia (about 690 kPaa), from about 0.01 psia (about 0.07 kPaa) to about 75 psia (about 520 kPaa), from about 0.01 psia (about 0.07 kPaa) to about 60 psia (about 410 kPaa), from about 0.01 psia (about 0.07 kPaa) to about 50 psia (about 340 kPaa), from about 0.01 psia (about 0.07 kPaa) to about 40 psia (about 280 kPaa), from about 0.01 psia (about 0.07 kPaa) to about 30 psia (about 210 kPaa), from about 0.01 psia (about 0.07 kPaa) to about 25 psia (about 170 kPaa), from about 0.01 psia (about 0.07 kPaa) to about 20 psia (about 140 kPaa), from about 0.01 psia (about 0.07 kPaa) to about 15 psia (about 100 kPaa), from about 0.1 psia (about 0.7 kPaa) to about 300 psia (about 2.0 MPaa), from about 0.1 psia (about 0.7 kPaa) to about 200 psia (about 1.4 MPaa), from about 0.1 psia (about 0.7 kPaa) to about 150 psia (about 1.0 MPaa), from about 0.1 psia (about 0.7 kPaa) to about 100 psia (about 690 kPaa), from about 0.1 psia (about 0.7 kPaa) to about 75 psia (about 520 kPaa), from about 0.1 psia (about 0.7 kPaa) to about 60 psia (about 410 kPaa), from about 0.1 psia (about 0.7 kPaa) to about 50 psia (about 340 kPaa), from about 0.1 psia (about 0.7 kPaa) to about 40 psia (about 280 kPaa), from about 0.1 psia (about 0.7 kPaa) to about 30 psia (about 210 kPaa), from about 0.1 psia (about 0.7 kPaa) to about 25 psia (about 170 kPaa), from about 0.1 psia (about 0.7 kPaa) to about 20 psia (about 140 kPaa), from about 0.1 psia (about 0.7 kPaa) to about 15 psia (about 100 kPaa), from about 1 psia (about 7 kPaa) to about 300 psia (about 2.0 MPaa), from about 1 psia (about 7 kPaa) to about 200 psia (about 1.4 MPaa), from about 1 psia (about 7 kPaa) to about 150 psia (about 1.0 MPaa), from about 1 psia (about 7 kPaa) to about 100 psia (about 690 kPaa), from about 1 psia (about 7 kPaa) to about 75 psia (about 520 kPaa), from about 1 psia (about 7 kPaa) to about 60 psia (about 410 kPaa), from about 1 psia (about 7 kPaa) to about 50 psia (about 340 kPaa), from about 1 psia (about 7 kPaa) to about 40 psia (about 280 kPaa), from about 1 psia (about 7 kPaa) to about 30 psia (about 210 kPaa), from about 1 psia (about 7 kPaa) to about 25 psia (about 170 kPaa), from about 1 psia (about 7 kPaa) to about 20 psia (about 140 kPaa), from 1 psia (about 7 kPaa) to about 15 psia (about 100 kPaa), from about 10 psia (about 70 kPaa) to about 300 psia (about 2.0 MPaa), from about 10 psia (about 70 kPaa) to about 200 psia (about 1.4 MPaa), from about 10 psia (about 70 kPaa) to about 150 psia (about 1.0 MPaa), from about 10 psia (about 70 kPaa) to about 100 psia (about 690 kPaa), from about 10 psia (about 70 kPaa) to about 75 psia (about 520 kPaa), from about 10 psia (about 70 kPaa) to about 60 psia (about 410 kPaa), from about 10 psia (about 70 kPaa) to about 50 psia (about 340 kPaa), from about 10 psia (about 70 kPaa) to about 40 psia (about 280 kPaa), from about 10 psia (about 70 kPaa) to about 30 psia (about 210 kPaa), from about 10 psia (about 70 kPaa) to about 25 psia (about 170 kPaa), from about 10 psia (about 70 kPaa) to about 20 psia (about 140 kPaa), from 10 psia (about 70 kPaa) to about 15 psia (about 100 kPaa), from about 15 psia (about 100 kPaa) to about 300 psia (about 2.0 MPaa), from about 15 psia (about 100 kPaa) to about 200 psia (about 1.4 MPaa), from about 15 psia (about 100 kPaa) to about 150 psia (about 1.0 MPaa), from about 15 psia (about 100 kPaa) to about 100 psia (about 690 kPaa), from about 15 psia (about 100 kPaa) to about 75 psia (about 520 kPaa), from about 15 psia (about 100 kPaa) to about 60 psia (about 410 kPaa), from about 15 psia (about 100 kPaa) to about 50 psia (about 340 kPaa), from about 15 psia (about 100 kPaa) to about 40 psia (about 280 kPaa), from about 15 psia (about 100 kPaa) to about 30 psia (about 210 kPaa), from about 15 psia (about 100 kPaa) to about 25 psia (about 170 kPaa), or from about 15 psia (about 100 kPaa) to about 20 psia (about 140 kPaa).

In certain embodiments, the temperature conditions for all the input streams, output streams, and solid monolithic sorbent in the $CO_2$ sorption step, in the $CO_2$ desorption step, and/or in the optional at most partial cooling step can collectively range from about −40° C. to about 250° C., e.g., from about −25° C. to about 250° C., from about −10° C. to about 250° C., from about 0° C. to about 250° C., from about 5° C. to about 250° C., from about 10° C. to about 250° C., from about 15° C. to about 250° C., from about 20° C. to about 250° C., from about 25° C. to about 250° C., from about 30° C. to about 250° C., from about 35° C. to about 250° C., from about 40° C. to about 250° C., from about 45° C. to about 250° C., from about 50° C. to about 250° C., from about 60° C. to about 250° C., from about 70° C. to about 250° C., from about 80° C. to about 250° C., from about 90° C. to about 250° C., from about −40° C. to about 225° C. from about −25° C. to about 225° C., from about −10° C. to about 225° C., from about 0° C. to about 225° C., from about 5° C. to about 225° C., from about 10° C. to about 225° C., from about 15° C. to about 225° C., from about 20° C. to about 225° C., from about 25° C. to about 225° C., from about 30° C. to about 225° C., from about 35° C. to about 225° C. from about 40° C. to about 225° C., from about 45° C. to about 225° C., from about 50° C. to about 225° C., from about 60° C. to about 225° C., from about 70° C. to about 225° C., from about 80° C. to about 225° C., from about 90° C. to about 225° C., from about −40° C. to about 205° C., from about −25° C. to about 205° C., from about −10° C. to about 205° C., from about 0° C. to about 205° C., from about 5° C. to about 205° C., from about 10° C. to about 205° C., from about 15° C. to about 205° C., from about 20° C. to about 205° C., from about 25° C. to about 205° C., from about 30° C. to about 205° C., from about 35° C. to about 205° C., from about 40° C. to about 205° C., from about 45° C. to about 205° C., from about 50° C. to about 205° C., from about 60° C. to about 205° C., from about 70° C. to about 205° C., from about 80° C. to about 205° C., from about 90° C. to about 205° C., from about −40° C. to about 190° C., from about −25° C. to about 190° C., from about −10° C. to about 190° C., from about 0° C. to about 190° C., from about 5° C. to about 190° C., from about 10° C. to about 190° C., from about 15° C. to about 190° C., from about 20° C. to about 190° C., from about 25° C. to about 190° C., from about 30° C. to about 190° C., from about 35° C. to about 190° C., from about 40° C. to about 190° C., from about 45° C. to about 190° C., from about 50° C. to about 190° C., from about 60° C. to about 190° C., from about 70° C. to about 190° C., from about 80° C. to about 190° C., from about 90° C. to about 190° C., from about −40° C. to about 175° C., from about −25° C. to about 175° C. from about −10° C. to about 175° C., from about 0° C. to about 175° C., from about 5° C. to about 175° C., from about 10° C. to about 175° C., from about 15° C. to about 175° C., from about 20° C. to about 175° C., from about 25° C. to about 175° C., from about 30° C. to about 175° C., from about 35° C. to about 175° C., from about 40° C. to about 175° C., from about 45° C. to about 175° C., from about 50° C. to about 175° C., from about 60° C. to about 175° C., from about 70° C. to about 175° C., from about 80° C. to about 175° C., from about 90° C. to about 175° C., from about −40° C. to about 160° C., from about −25° C. to about 160° C., from about −10° C. to about 160° C., from about 0° C. to about 160° C., from about 5° C. to about 160° C., from about 10° C. to about 160° C., from about 15° C. to about 160° C., from about 20° C. to about 160° C., from about 25° C. to about 160° C., from about 30° C. to about 160° C., from about 35° C. to about 160° C., from about 40° C. to about 160° C., from about 45° C. to about 160° C., from about 50° C. to about 160° C., from about 60° C. to about 160° C., from about 70° C. to about 160° C., from about 80° C. to about 160° C., from about 90° C. to about 160° C., from about −40° C. to about 145° C., from about −25° C. to about 145° C., from about −10° C. to about 145° C., from about 0° C. to about 145° C., from about 5° C. to about 145° C., from about 10° C. to about 145° C., from about 15° C. to about 145° C., from about 20° C. to about 145° C., from about 25° C. to about 145° C., from about 30° C. to about 145° C., from about 35° C. to about 145° C., from about 40° C. to about 145° C., from about 45° C. to about 145° C., from about 50° C. to about 145° C., from about 60° C. to about 145° C., from about 70° C. to about 145° C., from about 80° C. to about 145° C., or from about 90° C. to about 145° C.

Aside from the stripping stream that functions to desorb at least a portion of the $CO_2$ in the desorption step, additional regeneration of the sorbent material may be carried out periodically, as necessary to achieve appropriate sorption and desorption performance under the methods according to the invention. The periodic additional regeneration may be regular (e.g., every cycle, every certain number of cycles, every certain number of days or months, or the like) and/or irregular (e.g., when one or more aspects of the methods according to the invention become difficult or impractical and/or upon failure of one or more aspects of the methods according to the invention such as lack of fluid communication, operation outside of a desired specification, or the like, or a combination thereof), inter alia. Additional (non-stripping) regeneration of the sorbent material can include, but is not necessarily limited to, induction heating and/or microwave irradiation. In the case of a sorbent monolith configured to rotate on a central axis, the mechanism of microwave irradiation can, in some embodiments, result in an internal heating emanating from one or more appropriately placed microwave antennae, e.g. axially and radially outward therefrom. Additionally or alternately in the case of a sorbent monolith, induction heating can, in many embodiments, result in an external heating emanating inward from the induction source, e.g., such that the skin/surface of the monolith is rapidly heated, with the heat being transferred axially and radially inward through the remainder of the monolith.

Alternatively, in the $CO_2$ sorption step, the advantageous methods according to the invention can make it possible to use a solid monolithic sorbent having a $CO_2$ to specific contaminant (e.g., $CO_2/N_2$, $CO_2/CH_4$, or the like) selectivity of 3 or less, e.g., 2.5 or less, 2 or less, from 1 to 3, from 1.2 to 3, from 1.4 to 3, from 1.6 to 3, from 1.8 to 3, from 2 to 3, from 1 to 2.5, from 1.2 to 2.5, from 1.6 to 2.5, from 1.8 to 2.5, from 2 to 2.5, from 1 to 2, from 1.2 to 2, from 1.4 to 2, or from 1.6 to 2. In such embodiments, the use of a relatively unselective sorbent material can be used to attain efficiencies, yields, purities, and/or other improvements flowing from the methods according to the invention that would have required a relatively selective (or at least significantly higher selectivity) sorbent material to be used in otherwise identical processes with cooling steps and/or with drying steps, or the like.

FIG. 1 illustrates the general concept of a sorption step of a sorption-desorption cycle/method according to the invention, using as the exemplary mixed gas source(s) a refinery flue gas feed comprising $CO_2$ (about 10-20 vol % of the gas), $N_2$ (the majority of the gas), and optionally some $H_2O$ vapor, as well as some optional impurities such as those listed herein, in which a thermal wave is propagating through the thickness of the sorbent material faster than the sorption wave. FIG. 1 shows a view through the thickness of a sorbent, in the form of a solid monolithic rotary wheel configuration according to the invention, with a rotational axis extending parallel to the top/bottom of the page with sorption flow from left to right.

In FIG. 1 is shown a schematic of a solid monolithic sorbent rotary wheel according to the invention with a rotational axis extending parallel to the top/bottom of the page with (sorptive) flow from left to right. This sorbent is in the midst of a sorption step of a sorption-desorption cycle/method according to the invention, where the leading edge of the thermal wave (T) is located at a position downstream (further through the thickness) from the leading edge of the $CO_2$ sorption wave (S). In one embodiment of the invention, the liquid phase water added to the mixed gas source(s) to form the dual phase sorption feed can assist the sorption of heat generated during the sorption step and/or the heat residual in the sorbent from the desorption step of a previous (continuous or semi-continuous) cycle (e.g., by changing phase into gas phase water vapor), such that the thermal wave is propagating faster than the $CO_2$ sorption wave—in such embodiments, advantageously no separate cooling step can be included to reduce the temperature of the sorbent material, as none is needed. In any event, even in embodiments where the thermal wave is not propagating faster than the $CO_2$ sorption wave, the optional separate cooling step may be undertaken to give the thermal wave a nudge/head start, such that the leading edge of the thermal wave stays at a position downstream (forward through the thickness) of the leading edge of the $CO_2$ sorption wave, which can happen even if the thermal wave is propagating at the same or at a slower rate compared to the leading edge of the $CO_2$ sorption wave. The portion of the dual phase sorption feed in the gas phase and not (selectively) sorbed by the sorbent material can also have a front with a leading edge (represented in FIG. 1 by G).

FIG. 1 also identifies five (5) possible segments of the sorbent through its thickness during a typical sorption step. Though FIG. 1 represents these as roughly equivalent segments, this is merely for illustration purposes, as the relative thickness portions of each section should be understood by one of ordinary skill in the art to vary throughout the course of a sorption step, and some or most segments may disappear entirely at/toward the beginning of the sorption step and at/toward the end of the sorption step. In any event, as the $CO_2$ sorption wave, which is shown in FIG. 1 as the wave having its leading edge positioned at the least downstream position within the thickness (closest to the inlet position, which is at thickness=0), flows through the sorbent thickness, there can be two segments relating to this wave—the segment where $CO_2$ is being actively sorbed, termed here the "$CO_2$ hot" segment (second segment), where the exothermic sorption reaction causes the sorbent to locally increase in temperature; and the segment where the liquid phase water, and to a lesser degree the not selectively sorbed components of the gas phase, from the dual phase sorption feedstream has mitigated the heat increase, termed here the "$CO_2$ at equilibrium" segment (first segment), such that this segment can contain $CO_2$ selectively sorbed on the sorbent at approximately the feed temperature. The thermal wave can also encompass two segments—the $CO_2$ hot segment (second segment) and the "$N_2$ hot segment" (third segment), which can be forward of the $CO_2$ hot segment. The $N_2$ hot segment need not contain nitrogen, but is only indicative of segment where any non-selectively sorbed components of the gas phase can pass through the sorption zone ($CO_2$ hot segment), as their flow is not considerably slowed by the selective sorption action of the sorbent material. It should be understood that the trailing edge of the thermal wave can also be the boundary between the first segment ($CO_2$ at equilibrium/feed temperature) and the second segment ($CO_2$ hot segment). Forward of the thermal wave is the "$N_2$ cold segment" (fourth segment), which, like the $N_2$ hot segment, need not contain only nitrogen but can contain any non-selectively sorbed components of the gas phase passing through the sorption zone—this portion of the gas can be ahead of the thermal front, and therefore cold relative to the third segment, and it should be understood that this segment can represent the foremost segment of the gas phase front, whose leading edge can also be the front boundary of this segment. Forward of the $N_2$ cold segment is the "untouched" segment (fifth segment), which portion of the thickness of the sorbent material has yet to be exposed to any gas/liquid and to any selectively sorbed/non-selectively sorbed/not sorbed components.

If the inlet edge of the sorbent thickness in FIG. 1 is arbitrarily set to be thickness=0, and the outlet edge of the sorbent thickness is set to be thickness=t, then positions through the thickness can be expressed as fractions of t, and thus ratios of positions, e.g., of one leading edge to another leading edge, can be expressed as numbers having dimensionless units (some fraction of t divided by some other fraction of t). A dimensionless unit greater than 1 indicates that the first position in the ratio is further downstream (further through the thickness toward t, in the direction of flow) than the second position in the ratio. A dimensionless unit less than 1 indicates that the first position in the ratio is upstream (not further through the thickness, but closer to 0) of the second position in the ratio. In that respect, for a thermal wave propagating faster than a sorption wave, the ratio of their leading edges will always be greater than 1. In some embodiments, in the sorption step, the ratio of thickness position of the leading edge of the thermal wave to the leading edge of the sorption wave can be at least 1.01, e.g. at least 1.02, at least 1.03, at least 1.04, at least 1.05, at least 1.06, at least 1.07, at least 1.08, at least 1.09, at least 1.1, at least 1.15, at least 1.2, at least 1.25, at least 1.3, at least 1.35, at least 1.4, at least 1.45, or at least 1.5; additionally or alternately, in the sorption step, the ratio of thickness position of the leading edge of the thermal wave to the leading edge of the sorption wave can be at most 1.8, e.g., at most 1.75, at most 1.7, at most 1.65, at most 1.6, at most 1.55, at most 1.5, at most 1.45, at most 1.4, at most 1.35, at most 1.3, at most 1.25, at most 1.2, at most 1.15, at most 1.1, at most 1.09, at most 1.08, at most 1.07, at most 1.06, at most 1.05, at most 1.04, or at most 1.03. Further additionally or alternately, in the sorption step, the ratio of thickness position of the leading edge of the not (selectively) sorbed gas phase wave to the leading edge of the thermal wave can be at least 1.01, e.g., at least 1.02, at least 1.03, at least 1.04, at least 1.05, at least 1.06, at least 1.07, at least 1.08, at least 1.09, at least 1.1, at least 1.15, at least 1.2, at least 1.25, at least 1.3, at least 1.35, at least 1.4, at least 1.45, or at least 1.5; still further additionally or alternately, in the sorption step, the ratio of thickness position of the leading edge of the not (selectively) sorbed gas phase wave to the leading edge of the thermal wave can be at most 1.8, e.g., at most 1.75, at most 1.7, at most 1.65, at most 1.6, at most 1.55, at most 1.5, at most 1.45, at most 1.4, at most 1.35, at most 1.3, at most 1.25, at most 1.2, at most 1.15, at most 1.1, at most 1.09, at most 1.08, at most 1.07, at most 1.06, at most 1.05, at most 1.04, or at most 1.03. Yet further additionally or alternately, in the sorption step, the ratio of thickness position of the leading edge of the not (selectively) sorbed gas phase wave to the leading edge of the sorption wave can be at least 1.05. e.g., at least 1.1, at least 1.15, at least 1.2, at least 1.25, at least 1.3, at least 1.35, at least 1.4, at least 1.45, at least 1.5, at least 1.55, at least 1.6, at least 1.65, at least 1.7, or at least 1.75; still further additionally or alternately, in the sorption step, the ratio of thickness position of the leading edge of the not (selectively) sorbed gas phase wave to the leading edge of the thermal wave can be at most 1.9, e.g., at most 1.85, at most 1.8, at most 1.75, at most 1.7, at most 1.65, at most 1.6, at most 1.55, at most 1.5, at most 1.45, at most 1.4, at most 1.35, at most 1.3, at most 1.25, at most 1.2, at most 1.15, or at most 1.1.

The method according to the invention can work on the schematic in FIG. 1, the method comprising a continuously rotating wheel packed with a $CO_2$ selective sorbent. The rotating adsorbent can undergo successive steps of (A) $CO_2$ sorption and (B) $CO_2$ desorption (e.g. by steam or another fluid), but no separate (C) drying of the sorbent and optionally also (D) cooling step for reducing the temperature of the sorbent. The cooling step (D) may be necessary only in cases where the thermal wave needs to be nudged and/or needs to have a head start through the thickness in order for the leading edge of the thermal wave to be located through the thickness of the sorbent at a position downstream (i.e., at a point further within the thickness, in the direction of sorptive flow) from the leading edge of the $CO_2$ sorption wave.

When a separate cooling step is used, co-current cooling can be a preferable alternative to countercurrent cooling. This can facilitate the upstream (or forward) portion of the thickness where sorption would take place first to stay the coldest, with the migrating hotter sorbent portion of the thickness to remain downstream of the migrating sorption zone. The benefits of this approach can be further enhanced by using a sorbent material with a relatively high sorption capacity and a relatively low heat capacity, in a particular embodiment, such that the thermal cooling wave can propagate faster than the sorption wave.

A design using a sorbent material with a relatively high sorption capacity and a relatively low heat capacity can create an environment in which the heat generated from sorption is advantageously not significantly taken up by the solid monolithic sorbent but can be swept away by the flowing gas (e.g., to facilitate the thermal wave moving faster than the sorption wave). Thus, the section of the sorbent undergoing sorption can stay relatively cold and can lag behind the thermal front. In many embodiments, the criteria for such a design can be represented by the inequality: $C_{p,solid}/C_{p,gas} < F^*(q/Y)$, where $C_{p,solid}$ represents the average heat capacity of the solid monolithic sorbent, $C_{p,gas}$ represents the average heat capacity of the dual phase sorption feed [in the same units as $C_{p,solid}$], F is a factor of approximately $2/3$, Y represents the mole fraction (molar ratio) of sorbate (e.g., $CO_2$) gas in the gas phase (compared to carrier gas), and q represents the molar amount of $CO_2$ gas adsorbed in equilibrium (in weight ratio) with a gas phase having composition Y. Other advantageous aspects of such a design can include: (A) the substrate on which the sorbent is wash coated itself having a relatively low heat capacity; and (B) the substrate having relatively low thermal conductivity. For example, a ceramic substrate can be preferred over a metal substrate. It can additionally or alternately be desirable to have a thermal barrier between the wash coat and the substrate, e.g., so that the sorption heat can remain in the wash coat to be swept away by the flowing gas and/or to be managed by the liquid phase water in the dual phase sorption feedstream.

In some embodiments, the amount of liquid phase water added to the mixed gas source(s) can advantageously be sufficient to increase the heat capacity of those mixed gas sources ($C_{p,gas}$) by at least about 300% (i.e., to at least about 4 times the value), e.g., by at least about 350%, by at least about 400%, by at least about 450%, by at least about 500%, by at least about 600%, by at least about 700%, or by at least about 800%. Additionally or alternately in such embodiments, the amount of liquid phase water added to the mixed gas source(s) can advantageously be sufficient to increase the heat capacity of those mixed gas sources ($C_{p,gas}$) by at most about 1900% (i.e., to at most about 20 times the value), e.g., by at most about 1600%, by at most about 1400%, by at most about 1200%, by at most about 1000%, by at most about 900%, by at most about 800%, by at most about 700%, by at most about 600%, or by at most about 500%.

Additionally or alternately, the present invention can include one or more of the following embodiments.

Embodiment 1

A method for enhanced control, separation, and/or purification of $CO_2$ gas from one or more sources having a mixture of gases, the method comprising: providing a solid monolithic sorbent material having a thickness and a selectivity for $CO_2$ sorption in a continuous or semi-continuous sorption-desorption process comprising a $CO_2$ sorption step and a $CO_2$ desorption step, but not comprising either a drying step or a separate cooling step: providing one or more mixed gas sources containing $CO_2$ gas at a feed temperature, such that the mixed gas source(s) collectively exhibit not more than 70% water vapor saturation; adding liquid phase water droplets to the mixed gas source(s) to form a dual phase sorption feedstream containing $CO_2$ and $H_2O$ at approximately the feed temperature, the amount of liquid phase water being sufficient to cause the dual phase sorption feedstream to have at least 99% water vapor saturation at a desorption temperature, which is higher than the feed temperature, and to have at least gas phase $CO_2$ and $H_2O$ and liquid phase $H_2O$ components at the desorption temperature; in the $CO_2$ sorption step, exposing the dual phase sorption feedstream at approximately the feed temperature to the solid monolithic sorbent, which is at the desorption temperature, across the thickness of the sorbent under conditions sufficient for the solid monolithic sorbent to selectively sorb the desired $CO_2$ gas, thus forming a selectively $CO_2$-sorbed solid monolithic sorbent and a selectively $CO_2$-depleted product stream; and in the $CO_2$ desorption step, exposing the selectively $CO_2$-sorbed solid monolithic sorbent to a stripping stream, which contains moisture and which is at a stripping temperature that is at least about 20° C. higher than the feed temperature, across the thickness of the sorbent, thus forming a $CO_2$-desorbed monolithic sorbent, and a stripped product stream containing desorbed $CO_2$ and a lower moisture content than in the stripped product stream, wherein the $CO_2$ sorption step is exothermic and selectively sorptive for $CO_2$, such that the exposing of the dual phase sorption feedstream to the solid monolithic sorbent results in a thermal wave, having a leading edge, passing across the thickness of the sorbent and simultaneously in a $CO_2$ sorption wave, having a leading edge, passing across the thickness of the sorbent; wherein the leading edge of the thermal wave passes across the thickness of the sorbent in a position downstream from the leading edge of the $CO_2$ sorption wave and/or wherein the thermal wave passes across the thickness of the sorbent faster than the $CO_2$ sorption wave; and wherein the liquid phase water in the dual phase sorption feed sorbs heat resulting from the desorption temperature being greater than the feed temperature by changing to gas phase water vapor to simultaneously cool the sorbent during the sorption step, thus allowing the separate cooling step to be eliminated in the continuous or semi-continuous sorption-desorption process.

Embodiment 2

The method of embodiment 1, wherein an amount of liquid phase water droplets is added per gram of all combined mixed gas sources, so as to satisfy the following inequality: $C_{p,solid}/C_{p,gas} < F*(q/Y)$, where $C_{p,solid}$ represents the average heat capacity of the solid monolithic sorbent, $C_{p,gas}$ represents the average heat capacity of the dual phase sorption feed, F is a factor of approximately ⅔, Y represents a mole fraction of $CO_2$ gas in gas phase, and q represents an amount of $CO_2$ adsorbed in equilibrium with a gas phase having composition Y, such that a $C_{p,gas}$ of the dual phase sorption liquid is at least about 300% (e.g., at least about 500%) greater than a collective $C_{p,gas}$ of all combined mixed gas sources.

Embodiment 3

A method for enhanced control, separation, and/or purification of $CO_2$ gas from one or more sources having a mixture of gases, the method comprising: providing a solid monolithic sorbent material having a thickness and a selectivity for $CO_2$ sorption in a continuous or semi-continuous sorption-desorption process comprising a $CO_2$ sorption step and a $CO_2$ desorption step, but not comprising either a drying step or a separate cooling step: providing one or more mixed gas sources containing $CO_2$ gas at a feed temperature, such that the mixed gas source(s) collectively exhibit not more than 70% water vapor saturation; adding liquid phase water droplets to the mixed gas source(s) to form a dual phase sorption feedstream containing $CO_2$ and $H_2O$ at approximately the feed temperature, the amount of liquid phase water being sufficient to cause the dual phase sorption feedstream to have at least 99% water vapor saturation at a desorption temperature, which is higher than the feed temperature, and to have at least gas phase $CO_2$ and $H_2O$ and liquid phase $H_2O$ components at the desorption temperature; in the $CO_2$ sorption step, exposing the dual phase sorption feedstream at approximately the feed temperature to the solid monolithic sorbent, which is at the desorption temperature, across the thickness of the sorbent under conditions sufficient for the solid monolithic sorbent to selectively sorb the desired $CO_2$ gas, thus forming a selectively $CO_2$-sorbed solid monolithic sorbent and a selectively $CO_2$-depleted product stream; in the $CO_2$ desorption step, exposing the selectively $CO_2$-sorbed solid monolithic sorbent to a stripping stream, which contains moisture and which is at a stripping temperature that is at least about 20° C. higher than the inlet temperature, across the thickness of the sorbent, thus forming a $CO_2$-desorbed monolithic sorbent, and a stripped product stream containing desorbed $CO_2$ and a lower moisture content than in the at least partially stripped product stream; and in the at most partially cooling step, cooling only a portion of the thickness of the $CO_2$-desorbed monolithic sorbent by exposing the sorbent to a co-current cooling stream for a time and under conditions sufficient to cool only the portion of the thickness of the solid monolithic sorbent to approximately the feed temperature, wherein the portion of the thickness of the solid monolithic sorbent is less than one half the thickness of the solid monolithic sorbent, wherein the $CO_2$ sorption step is exothermic and selectively sorptive for $CO_2$, such that the exposing of the dual phase sorption feedstream to the solid monolithic sorbent results in a thermal wave, having a leading edge, passing across the thickness of the sorbent and simultaneously in a $CO_2$ sorption wave, having a leading edge, passing across the thickness of the sorbent; wherein the at most partial cooling step causes the leading edge of the thermal wave to start at a position within the thickness of the sorbent corresponding to the portion of the thickness of the sorbent that was cooled; wherein the thermal wave passes across the thickness of the sorbent only as fast as, or slower than, the $CO_2$ sorption wave, and yet wherein, due to the partial cooling step, the leading edge of the thermal wave still passes across the thickness of the sorbent in a position downstream from the leading edge of the $CO_2$ sorption wave; and wherein the liquid phase water in the dual phase sorption feed sorbs heat resulting from the desorption temperature being greater than the feed temperature by changing to gas phase water vapor to simultaneously partially cool the sorbent during the sorption step, thus allowing the separate cooling step to be partially eliminated in the continuous or semi-continuous sorption-desorption process.

Embodiment 4

The method of any one of the previous embodiments, wherein the solid monolithic sorbent rotates about a rotational axis that is substantially parallel to the thickness of the monolithic sorbent.

Embodiment 5

The method of any one of embodiments 1-4, wherein the solid monolithic sorbent has a $CO_2/N_2$ sorption selectivity at the operating conditions of at least 4.

Embodiment 6

The method of any one of embodiments 1-4, wherein the solid monolithic sorbent has a $CO_2/N_2$ sorption selectivity at the operating conditions of 3 or less.

Embodiment 7

The method of any one of the previous embodiments, wherein the source(s) of mixed gas each comprise(s) and/or collectively comprise from about 1 vol % to about 25 vol % $CO_2$ and from about 0.5 vol % to about 20 vol % moisture.

Embodiment 8

The method of any one of the previous embodiments, wherein the source(s) of mixed gas each comprise(s) and/or collectively comprise from about 10 vol % to about 45 vol % $CO_2$ and at least about 10 vol % $C_1$-$C_3$ hydrocarbons.

Embodiment 9

The method of any one of the previous embodiments, wherein the source(s) of mixed gas each comprise(s) and/or collectively comprise one or more of the following: from about 5 vppm to about 1000 vppm $SO_x$; from about 5 vppm to about 1000 vppm NOR; from about 1 vol % to about 40 vol % $H_2$; from about 10 vppm to about 4000 vppm $H_2S$; and from about 50 vppm to about 5 vol % CO.

Embodiment 10

The method of any one of the previous embodiments, wherein the source(s) of mixed gas each comprise(s) and/or collectively comprise a petroleum refinery flue gas stream, a water gas shift process product stream, a hydrocarbon conversion catalyst regeneration gas, a hydrocarbon combustion gas product stream, a virgin or partially treated natural gas stream, or a combination thereof.

Embodiment 11

The method of any one of the previous embodiments, wherein the solid monolithic sorbent is formed from: an alkalized alumina; an alkalized titania; activated carbon: 13X or 5 A molecular sieve; a zeolite having framework structure type AEI, AFT, AFX, ATN, AWW, CHA, DDR, EPI, ESV, FAU, KFI, LEV, LTA, PHI, RHO, SAV, or a combination or intergrowth thereof; a cationic zeolite material; a metal oxide whose metal(s) include(s) an alkali metal, an alkaline earth metal, a transition metal, or a combination thereof; a zeolite imidazolate framework material; a metal organic framework material; or a combination thereof.

Embodiment 11

The method of any one of the previous embodiments, wherein the cyclic sorption-desorption process has an average cycle time from about 1 minute to about 30 minutes.

Embodiment 12

The method of any one of the previous embodiments, wherein the conditions sufficient for the $CO_2$ desorption steps include a pressure swing/reduction, a temperature swing/increase, or both.

Embodiment 13

The method of any one of the previous embodiments, wherein the feed temperature is at least about 30° C. lower than the desorption temperature.

Embodiment 14

The method of any one of the previous embodiments, wherein the total pressure conditions in the $CO_2$ sorption and $CO_2$ desorption steps of the sorption-desorption process collectively range from about 0.01 psia (about 0.07 kPaa) to about 150 psia (about 1.0 MPaa).

Embodiment 15

The method of any one of the previous embodiments, wherein the temperature conditions for all the input streams, output streams, and solid monolithic sorbents in the $CO_2$ sorption and $CO_2$ desorption steps of the sorption-desorption process collectively range from about 25° C. to about 175° C.

EXAMPLE

A simulation was done to establish proof of principle that the heat capacity of an $CO_2$-containing input stream, in this case a refinery flue gas stream simulated to have ~10 vol % $CO_2$ and ~90 vol % $N_2$, could be increased sufficiently so as to yield a thermal wave propagating faster than a $CO_2$ sorption wave in an exemplary $CO_2$ selective sorbent, such as a DDR monolith. In this Example, the $C_{p,gas}$ value of the refinery flue gas stream (representing the collective sources of mixed gas) was estimated to be approximately 7.9 BTU/lbmol-° F. An amount of water vapor was added sufficient to increase the $C_{p,gas}$ value of the resulting stream to approximately 47 BTU/lbmol-° F., representing almost a 500% increase or a 6-fold value, relative to the refinery flue gas stream.

Although this simulation did not take into account the liquid phase aspect of the water, it is believed to establish nonetheless that a similar adjustment using liquid phase water, instead of gas phase water would also be probable, because the impact of the phase change of the water from liquid to gas (e.g., evaporative cooling) was not taken into account but should make it easier to attain a similar increase in heat capacity with a smaller amount of liquid phase water than the amount of gas phase water used in this Example.

Although the exothermic reaction of the $CO_2$ sorption of the unadditized refinery flue gas does not result in a thermal wave propagating faster than a $CO_2$ sorption wave, the simulation using the combination of the refinery flue gas and the added water vapor did appear to yield a thermal wave propagating faster than a $CO_2$ sorption wave in the sorbent material.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method for enhanced control, separation, and/or purification of CO.sub.2 gas from one or more sources having a mixture of gases, the method comprising:
   providing a solid monolithic sorbent material having a thickness and a selectivity for CO.sub.2 sorption in a continuous or semi-continuous sorption-desorption process comprising a CO.sub.2 sorption step and a CO.sub.2 desorption step, but comprising neither a drying step nor a separate cooling step; providing one or more mixed gas sources containing CO.sub.2 gas at a feed temperature, such that the mixed gas source(s) collectively exhibit not more than 70% water vapor saturation; adding liquid phase water droplets to the mixed gas source(s) to form a dual phase sorption feedstream containing CO.sub.2 and H.sub.2O at approximately the feed temperature, the amount of liquid phase water being sufficient to cause the dual phase sorption feedstream to have at least 99% water vapor saturation at a desorption temperature, which is higher than the feed temperature, and to have at least gas phase CO.sub.2 and H.sub.2O and liquid phase H.sub.2O components at the desorption temperature; in the CO.sub.2 sorption step, exposing the dual phase sorption feedstream at approximately the feed temperature to the solid monolithic sorbent, which is at the desorption temperature, across the thickness of the sorbent under conditions sufficient for the solid monolithic sorbent to selectively sorb the desired CO.sub.2 gas, thus forming a selectively CO.sub.2-sorbed solid monolithic sorbent and a selectively CO.sub.2-depleted product stream; and in the CO.sub.2 desorption step, exposing the selectively CO.sub.2-sorbed solid monolithic sorbent to a stripping stream, which contains moisture and which is at a stripping temperature that is at least about 20.degree. C. higher than the feed temperature, across the thickness of the sorbent, thus forming a CO.sub.2-desorbed monolithic sorbent, and a stripped product stream containing desorbed CO.sub.2, wherein the CO.sub.2 sorption step is exothermic and selectively sorptive for CO.sub.2, such that the exposing of the dual phase sorption feedstream to the solid monolithic sorbent results in a thermal wave, having a leading edge, passing across the thickness of the sorbent and simultaneously in a CO.sub.2 sorption wave, having a leading edge, passing across the thickness of the sorbent; wherein the leading edge of the thermal wave passes across the thickness of the sorbent in a position downstream from the leading edge of the CO.sub.2 sorption wave and/or wherein the thermal wave passes across the thickness of the sorbent faster than the CO.sub.2 sorption wave; and wherein the liquid phase water in the dual phase sorption feed sorbs heat resulting from the desorption temperature being greater than the feed temperature by changing to gas phase water vapor to simultaneously cool the sorbent during the sorption step, thus allowing the separate cooling step to be eliminated in the continuous or semi-continuous sorption-desorption process.

2. The method of claim 1, wherein the solid monolithic sorbent rotates about a rotational axis that is substantially parallel to the thickness of the monolithic sorbent.

3. The method of claim 1, wherein the solid monolithic sorbent has a $CO_2/N_2$ sorption selectivity at the operating conditions of at least 4.

4. The method of claim 1, wherein the solid monolithic sorbent has a $CO_2/N_2$ sorption selectivity at the operating conditions of 3 or less.

5. The method of claim 1, wherein the source(s) of mixed gas collectively comprise from about 1 vol % to about 25 vol % $CO_2$ and from about 0.5 vol % to about 20 vol % moisture.

6. The method of claim 1, wherein the source(s) of mixed gas collectively comprise from about 10 vol % to about 45 vol % $CO_2$ and at least about 10 vol % $C_1$-$C_3$ hydrocarbons.

7. The method of claim 1, wherein the source(s) of mixed gas collectively comprise one or more of the following: from about 5 vppm to about 1000 vppm $SO_x$; from about 5 vppm to about 1000 vppm $NO_x$; from about 1 vol % to about 40 vol % $H_2$; from about 10 vppm to about 4000 vppm $H_2S$; and from about 50 vppm to about 5 vol % CO.

8. The method of claim 1, wherein the source(s) of mixed gas each comprise(s) a petroleum refinery flue gas stream, a water gas shift process product stream, a hydrocarbon conversion catalyst regeneration gas, a hydrocarbon combustion gas product stream, a virgin or partially treated natural gas stream, or a combination thereof.

9. The method of claim 1, wherein the solid monolithic sorbent is formed from: an alkalized alumina; an alkalized titania; activated carbon; 13X or 5A molecular sieve; a zeolite having framework structure type AEI, AFT, AFX, ATN, AWW, CHA, DDR, EPI, ESV, FAU, KFI, LEV, LTA, PHI, RHO, SAV, or a combination or intergrowth thereof; a cationic zeolite material; a metal oxide whose metal(s) include(s) an alkali metal, an alkaline earth metal, a transition metal, or a combination thereof; a zeolite imidazolate framework material; a metal organic framework material; or a combination thereof.

10. The method of claim 1, wherein the cyclic sorption-desorption process has an average cycle time from about 1 minute to about 30 minutes.

11. The method of claim 1, wherein the conditions sufficient for the $CO_2$ desorption steps include a pressure swing/reduction, a temperature swing/increase, or both.

12. The method of claim 1, wherein the feed temperature is at least about 30° C. lower than the desorption temperature.

13. The method of claim 1, wherein the total pressure conditions in the $CO_2$ sorption and $CO_2$ desorption steps of the sorption-desorption process collectively range from about 0.01 psia (about 0.07 kPaa) to about 150 psia (about 1.0 MPaa).

14. The method of claim 1, wherein the temperature conditions for all the input streams, output streams, and solid monolithic sorbents in the $CO_2$ sorption and $CO_2$ desorption steps of the sorption-desorption process collectively range from about 25° C. to about 175° C.

15. The method of claim 1, wherein an amount of liquid phase water droplets is added per gram of all combined mixed gas sources, so as to satisfy the following inequality: $C_{p,solid}/C_{p,gas} < F*(q/Y)$, where $C_{p,solid}$ represents the average heat capacity of the solid monolithic sorbent, $C_{p,gas}$ represents the average heat capacity of the dual phase sorption feed, F is a factor of approximately ⅔, Y represents a mole fraction of $CO_2$ gas in gas phase, and q represents an amount of $CO_2$ adsorbed in equilibrium with a gas phase having composition Y, such that a $C_{p,gas}$ of the dual phase sorption liquid is at least about 300% greater than a collective $C_{p,gas}$ of all combined mixed gas sources.

16. A method for enhanced control, separation, and/or purification of CO.sub.2 gas from one or more sources having a mixture of gases, the method comprising:
providing a solid monolithic sorbent material having a thickness and a selectivity for CO.sub.2 sorption in a continuous or semi-continuous sorption-desorption process comprising a CO.sub.2 sorption step, a CO.sub.2 desorption step, and an at most partially cooling step, but not comprising a drying step; providing one or more mixed gas sources containing CO.sub.2 gas at a feed temperature, such that the mixed gas source(s) collectively exhibit not more than 70% water vapor saturation; adding liquid phase water droplets to the mixed gas source(s) to form a dual phase sorption feedstream containing $CO_2$ and $H_2O$ at approximately the feed temperature, the amount of liquid phase water being sufficient to cause the dual phase sorption feedstream to have at least 99% water vapor saturation at a desorption temperature, which is higher than the feed temperature, and to have at least gas phase $CO_2$ and $H_2O$ and liquid phase $H_2O$ components at the desorption temperature; in the $CO_2$ sorption step, exposing the dual phase sorption feedstream at approximately the feed temperature to the solid monolithic sorbent, which is at the desorption temperature, across the thickness of the sorbent under conditions sufficient for the solid monolithic sorbent to selectively sorb the desired $CO_2$ gas, thus forming a selectively $CO_2$-sorbed solid monolithic sorbent and a selectively $CO_2$-depleted product stream; in the $CO_2$ desorption step, exposing the selectively $CO_2$-sorbed solid monolithic sorbent to a stripping stream, which contains moisture and which is at a stripping temperature that is at least about 20.degree. C. higher than the inlet temperature, across the thickness of the sorbent, thus forming a $CO_2$-desorbed monolithic sorbent, and a stripped product stream containing desorbed $CO_2$; and in the at most partially cooling step, cooling only a portion of the thickness of the $CO_2$-desorbed monolithic sorbent by exposing the sorbent to a co-current cooling stream for a time and under conditions sufficient to cool only the portion of the thickness of the solid monolithic sorbent to approximately the feed temperature, wherein the portion of the thickness of the solid monolithic sorbent is less than one half the thickness of the solid monolithic sorbent, wherein the $CO_2$ sorption step is exothermic and selectively sorptive for $CO_2$, such that the exposing of the dual phase sorption feedstream to the solid monolithic sorbent results in a thermal wave, having a leading edge, passing across the thickness of the sorbent and simultaneously in a $CO_2$ sorption wave, having a leading edge, passing across the thickness of the sorbent; wherein the at most partial cooling step causes the leading edge of the thermal wave to start at a position within the thickness of the sorbent corresponding to the portion of the thickness of the sorbent that was cooled; wherein the thermal wave passes across the thickness of the sorbent only as fast as, or slower than, the $CO_2$ sorption wave, and yet wherein, due to the partial cooling step, the leading edge of the thermal wave still passes across the thickness of the sorbent in a position downstream from the leading edge of the $CO_2$ sorption wave; and wherein the liquid phase water in the dual phase sorption feed sorbs heat resulting from the desorption temperature being greater than the feed temperature by changing to gas phase water vapor to simultaneously partially cool the sorbent during the sorption step, thus allowing the separate cooling step to be partially eliminated in the continuous or semi-continuous sorption-desorption process.

17. The method of claim 16, wherein the solid monolithic sorbent rotates about a rotational axis that is substantially parallel to the thickness of the monolithic sorbent.

18. The method of claim 16, wherein the solid monolithic sorbent has a $CO_2/N_2$ sorption selectivity at the operating conditions of at least 4.

19. The method of claim 16, wherein the solid monolithic sorbent has a $CO_2/N_2$ sorption selectivity at the operating conditions of 3 or less.

20. The method of claim 16, wherein the source(s) of mixed gas collectively comprise one or more of the following: from about 5 vppm to about 1000 vppm $SO_x$; from about 5 vppm to about 1000 vppm $NO_x$; from about 1 vol % to about 40 vol % $H_2$; from about 10 vppm to about 4000 vppm $H_2S$; and from about 50 vppm to about 5 vol % CO.

21. The method of claim 16, wherein the source(s) of mixed gas each comprise(s) a petroleum refinery flue gas stream, a water gas shift process product stream, a hydrocarbon conversion catalyst regeneration gas, a hydrocarbon combustion gas product stream, a virgin or partially treated natural gas stream, or a combination thereof.

22. The method of claim 16, wherein the at least two solid monolithic sorbents are formed from: an alkalized alumina; an alkalized titania; activated carbon; 13X or 5 A molecular sieve; a zeolite having framework structure type AEI, AFT, AFX, ATN, AWW, CHA, DDR, EPI, ESV, FAU, KFI, LEV, LTA, PHI, RHO, SAV, or a combination or intergrowth thereof: a cationic zeolite material; a metal oxide whose metal(s) include(s) an alkali metal, an alkaline earth metal, a transition metal, or a combination thereof; a zeolite imidazolate framework material: a metal organic framework material; or a combination thereof.

23. The method of claim 16, wherein the cyclic sorption-desorption process has an average cycle time from about 1 minute to about 30 minutes.

24. The method of claim 16, wherein the conditions sufficient for the $CO_2$ desorption steps include a pressure swing/reduction, a temperature swing/increase, or both.

25. The method of claim 16, wherein the feed temperature is at least about 30° C. lower than the desorption temperature.

26. The method of claim 16, wherein the total pressure conditions in the $CO_2$ sorption and $CO_2$ desorption steps of the sorption-desorption process collectively range from about 0.01 psia (about 0.07 kPaa) to about 150 psia (about 1.0 MPaa).

27. The method of claim 16, wherein the temperature conditions for all the input streams, output streams, and solid monolithic sorbents in the $CO_2$ sorption and $CO_2$ desorption steps of the sorption-desorption process collectively range from about 25° C. to about 175° C.

* * * * *